US010705693B2

(12) United States Patent
Kang et al.

(10) Patent No.: US 10,705,693 B2
(45) Date of Patent: Jul. 7, 2020

(54) METHOD AND DEVICE FOR EXECUTING APPLICATION USING ICON ASSOCIATED WITH APPLICATION METADATA

(71) Applicant: SAMSUNG ELECTRONICS CO., LTD., Suwon-si (KR)

(72) Inventors: Nam-wook Kang, Seoul (KR); Joo-yoon Bae, Seoul (KR); Eun-mee Shin, Yongin-si (KR); Keum-koo Lee, Yongin-si (KR); Young-kyu Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 14/227,745

(22) Filed: Mar. 27, 2014

(65) Prior Publication Data
US 2014/0298248 A1 Oct. 2, 2014

Related U.S. Application Data

(60) Provisional application No. 61/805,632, filed on Mar. 27, 2013.

(30) Foreign Application Priority Data

Aug. 2, 2013 (KR) ........................ 10-2013-0092242

(51) Int. Cl.
*G06F 3/0484* (2013.01)
*G06F 3/0481* (2013.01)
*G06F 3/0482* (2013.01)

(52) U.S. Cl.
CPC ........ *G06F 3/04842* (2013.01); *G06F 3/0482* (2013.01); *G06F 3/04817* (2013.01)

(58) Field of Classification Search
None
See application file for complete search history.

(56) References Cited

U.S. PATENT DOCUMENTS

| 5,666,502 A | 9/1997 | Capps |
| 6,008,809 A | 12/1999 | Brooks |

(Continued)

FOREIGN PATENT DOCUMENTS

| CN | 101617287 A | 12/2009 |
| CN | 101788880 A | 7/2010 |

(Continued)

OTHER PUBLICATIONS

Android Developers, "Notifications," ("Android Developer") published on Jun. 29, 2013, <URL=https://webbeta.archive.org/web/20130629181856/https://developer.android.com/guide/topics/ui/notifiers/notifications.html>.*

(Continued)

*Primary Examiner* — James T Tsai
(74) *Attorney, Agent, or Firm* — Sughrue Mion, PLLC

(57) ABSTRACT

A method and device for executing an application include operations of displaying an interest object on a screen of the device, in response to selection of the interest object, obtaining metadata matched with the interest object, determining an associated application associated with the interest object, executing the associated application by using the metadata as an input value to the associated application, and displaying, on the screen, a window indicating an execution result of the associated application executed by using the metadata.

27 Claims, 13 Drawing Sheets

(56) References Cited

U.S. PATENT DOCUMENTS

| | | |
|---|---|---|
| 6,397,337 B1 | 5/2002 | Garrett et al. |
| 7,512,400 B2 | 3/2009 | Starbuck et al. |
| 7,657,849 B2 | 2/2010 | Chaudhri et al. |
| 7,720,834 B2 * | 5/2010 | Ali .................. G06F 16/907 |
| | | 707/706 |
| 8,046,721 B2 | 10/2011 | Chaudhri et al. |
| 8,351,897 B2 | 1/2013 | Shin et al. |
| 8,411,046 B2 | 4/2013 | Kruzeniski et al. |
| 8,443,199 B2 | 5/2013 | Kim et al. |
| 8,619,038 B2 | 12/2013 | Chaudhri et al. |
| 8,854,318 B2 * | 10/2014 | Borovsky ......... G06F 3/04883 |
| | | 345/156 |
| 9,027,117 B2 | 5/2015 | Wilairat |
| 9,176,747 B2 | 11/2015 | Rolston et al. |
| 9,178,981 B2 | 11/2015 | Cho et al. |
| 9,182,889 B1 * | 11/2015 | Karlo ............... G06F 3/04817 |
| 9,292,310 B2 * | 3/2016 | Chaudhri ............ G06F 9/4443 |
| 9,384,014 B2 | 7/2016 | Kim et al. |
| 9,395,914 B2 | 7/2016 | Chun |
| 9,471,217 B2 | 10/2016 | Shin et al. |
| 10,033,855 B2 | 7/2018 | Chae et al. |
| 10,459,625 B2 | 10/2019 | Seo et al. |
| 2002/0115476 A1 * | 8/2002 | Padawer ........... H04M 1/27455 |
| | | 455/564 |
| 2004/0095395 A1 | 5/2004 | Kurtenbach |
| 2005/0149879 A1 | 7/2005 | Jobs et al. |
| 2005/0243979 A1 | 11/2005 | Starbuck et al. |
| 2006/0167861 A1 | 7/2006 | Arrouye et al. |
| 2006/0229097 A1 | 10/2006 | Flynt et al. |
| 2006/0294084 A1 | 12/2006 | Patel et al. |
| 2007/0099642 A1 | 5/2007 | Jin et al. |
| 2007/0150842 A1 | 6/2007 | Chaudhri et al. |
| 2007/0168368 A1 | 7/2007 | Stone |
| 2007/0229549 A1 * | 10/2007 | Dicke .................. G01C 21/362 |
| | | 345/676 |
| 2007/0256054 A1 * | 11/2007 | Byrne ..................... G06F 8/73 |
| | | 717/113 |
| 2008/0020803 A1 | 1/2008 | Rios et al. |
| 2008/0052717 A1 | 2/2008 | Lee |
| 2008/0062141 A1 | 3/2008 | Chandhri |
| 2008/0109751 A1 | 5/2008 | Fitzmaurice et al. |
| 2008/0166993 A1 | 7/2008 | Gautier et al. |
| 2008/0168368 A1 | 7/2008 | Louch et al. |
| 2008/0320033 A1 | 12/2008 | Koistinen et al. |
| 2009/0013275 A1 | 1/2009 | May et al. |
| 2009/0013282 A1 | 1/2009 | Mercer |
| 2009/0019120 A1 | 1/2009 | Muguda |
| 2009/0083847 A1 | 3/2009 | Fadell et al. |
| 2009/0094339 A1 | 4/2009 | Allen et al. |
| 2009/0240647 A1 | 9/2009 | Green et al. |
| 2009/0241072 A1 | 9/2009 | Chaudhri et al. |
| 2010/0023892 A1 | 1/2010 | Rakesh et al. |
| 2010/0070898 A1 | 3/2010 | Langlois et al. |
| 2010/0088634 A1 | 4/2010 | Tsuruta et al. |
| 2010/0146451 A1 | 6/2010 | Jun-Dong et al. |
| 2010/0211872 A1 | 8/2010 | Rolston et al. |
| 2010/0229115 A1 | 9/2010 | Augustine et al. |
| 2010/0269040 A1 | 10/2010 | Lee |
| 2010/0306705 A1 | 12/2010 | Nilsson |
| 2010/0313125 A1 | 12/2010 | Fleizach et al. |
| 2010/0313156 A1 | 12/2010 | Louch et al. |
| 2011/0047134 A1 | 2/2011 | Zhang et al. |
| 2011/0093812 A1 | 4/2011 | Fong |
| 2011/0126156 A1 | 5/2011 | Krishnaraj et al. |
| 2011/0154290 A1 | 6/2011 | Kelly |
| 2011/0167387 A1 | 7/2011 | Stallings et al. |
| 2011/0175930 A1 | 7/2011 | Hwang et al. |
| 2011/0202872 A1 | 8/2011 | Park |
| 2011/0242138 A1 | 10/2011 | Tribble |
| 2011/0258581 A1 | 10/2011 | Hu |
| 2011/0300831 A1 | 12/2011 | Chin |
| 2011/0316884 A1 | 12/2011 | Giambalvo et al. |
| 2012/0005569 A1 | 1/2012 | Roh |
| 2012/0005577 A1 | 1/2012 | Chakra et al. |
| 2012/0023573 A1 | 1/2012 | Shi |
| 2012/0026400 A1 * | 2/2012 | Kang ............... H04N 21/42214 |
| | | 348/570 |
| 2012/0046079 A1 * | 2/2012 | Kim ................... H04M 1/72577 |
| | | 455/566 |
| 2012/0060123 A1 | 3/2012 | Smith |
| 2012/0084734 A1 | 4/2012 | Wilairat |
| 2012/0110483 A1 | 5/2012 | Arcese et al. |
| 2012/0117599 A1 | 5/2012 | Jin et al. |
| 2012/0129496 A1 | 5/2012 | Park et al. |
| 2012/0131471 A1 | 5/2012 | Terlouw et al. |
| 2012/0159395 A1 * | 6/2012 | Deutsch ............... G06F 3/0481 |
| | | 715/835 |
| 2012/0164971 A1 | 6/2012 | Choi et al. |
| 2012/0166997 A1 | 6/2012 | Cho et al. |
| 2012/0173995 A1 * | 7/2012 | Alameh ............... G06F 3/0486 |
| | | 715/761 |
| 2012/0174042 A1 | 7/2012 | Chang |
| 2012/0179969 A1 | 7/2012 | Lee et al. |
| 2012/0210253 A1 | 8/2012 | Luna et al. |
| 2012/0210266 A1 | 8/2012 | Jiang et al. |
| 2012/0256863 A1 | 10/2012 | Zhang et al. |
| 2012/0272338 A1 | 10/2012 | Falkenburg et al. |
| 2012/0289287 A1 | 11/2012 | Kokubo |
| 2012/0290972 A1 | 11/2012 | Yook et al. |
| 2012/0297289 A1 | 11/2012 | Dovey et al. |
| 2012/0297304 A1 | 11/2012 | Maxwell |
| 2012/0304118 A1 * | 11/2012 | Donahue ............. G06F 3/04842 |
| | | 715/808 |
| 2012/0309433 A1 | 12/2012 | Jeong et al. |
| 2012/0322470 A1 * | 12/2012 | Said ..................... G06Q 10/107 |
| | | 455/466 |
| 2012/0324357 A1 | 12/2012 | Viegers et al. |
| 2013/0007665 A1 | 1/2013 | Chaudhri et al. |
| 2013/0014006 A1 * | 1/2013 | Abellera ............. G06F 3/04817 |
| | | 715/234 |
| 2013/0042191 A1 | 2/2013 | Kim et al. |
| 2013/0047119 A1 | 2/2013 | Lee |
| 2013/0052993 A1 | 2/2013 | Kwon et al. |
| 2013/0053105 A1 | 2/2013 | Lee et al. |
| 2013/0054548 A1 | 2/2013 | Fosback et al. |
| 2013/0061164 A1 * | 3/2013 | Chen ..................... G06F 3/0481 |
| | | 715/779 |
| 2013/0063452 A1 | 3/2013 | Ali et al. |
| 2013/0063479 A1 | 3/2013 | Butlin et al. |
| 2013/0067376 A1 | 3/2013 | Kim et al. |
| 2013/0069893 A1 * | 3/2013 | Brinda ................. G06F 3/0488 |
| | | 345/173 |
| 2013/0083210 A1 | 4/2013 | Beckham et al. |
| 2013/0091468 A1 | 4/2013 | Xie |
| 2013/0145303 A1 * | 6/2013 | Prakash .............. G06F 3/04883 |
| | | 715/779 |
| 2013/0219332 A1 * | 8/2013 | Woley ................... G06F 1/3209 |
| | | 715/808 |
| 2013/0232256 A1 | 9/2013 | Lee et al. |
| 2013/0254693 A1 | 9/2013 | Oh |
| 2013/0346882 A1 * | 12/2013 | Shiplacoff .......... G06F 3/04842 |
| | | 715/753 |
| 2014/0082502 A1 * | 3/2014 | Rubel .................... G06F 3/0346 |
| | | 715/733 |
| 2014/0287724 A1 * | 9/2014 | Takenouchi .......... G06F 3/0482 |
| | | 455/411 |
| 2017/0090738 A1 | 3/2017 | Kurtz et al. |
| 2018/0321835 A1 | 11/2018 | Shin et al. |

FOREIGN PATENT DOCUMENTS

| | | |
|---|---|---|
| CN | 101836182 A | 9/2010 |
| CN | 101853379 A | 10/2010 |
| CN | 102053783 A | 5/2011 |
| CN | 102109945 A | 6/2011 |
| CN | 102279710 A | 12/2011 |
| CN | 102301330 A | 12/2011 |
| CN | 102402661 A | 4/2012 |
| CN | 102439861 A | 5/2012 |
| CN | 102591584 A | 7/2012 |
| CN | 102710847 A | 10/2012 |
| EP | 2 112 583 A1 | 10/2009 |

(56) References Cited

FOREIGN PATENT DOCUMENTS

| EP | 2230623 A1 | 9/2010 |
|---|---|---|
| EP | 2 533 140 A1 | 12/2012 |
| EP | 2 551 762 A1 | 1/2013 |
| FR | 2971069 A | 8/2012 |
| JP | 3135104 B2 | 2/2001 |
| JP | 2004-191642 A | 7/2004 |
| JP | 2012-181847 A | 9/2012 |
| KR | 10-2006-0131544 A | 12/2006 |
| KR | 10-0683483 B1 | 2/2007 |
| KR | 10-2007-0115622 A | 12/2007 |
| KR | 10-2007-0120368 A | 12/2007 |
| KR | 10-2008-0043764 A | 5/2008 |
| KR | 10-2009-0093444 A | 9/2009 |
| KR | 10-2010-0027689 A | 3/2010 |
| KR | 10-2010-0066002 A | 6/2010 |
| KR | 10-2010-0114779 A | 10/2010 |
| KR | 10-2010-0124427 A | 11/2010 |
| KR | 10-2010-0127382 A | 12/2010 |
| KR | 10-2010-0134234 A | 12/2010 |
| KR | 10-2011-0011226 A | 2/2011 |
| KR | 10-2011-0026811 A | 3/2011 |
| KR | 10-2012-0006805 A | 1/2012 |
| KR | 10-2012-0054837 A | 5/2012 |
| KR | 10-2012-0089985 A | 8/2012 |
| KR | 10-2012-0092036 A | 8/2012 |
| KR | 10-2012-0126161 A | 11/2012 |
| KR | 10-2012-0131906 A | 12/2012 |
| KR | 10-2013-0006991 A | 1/2013 |
| KR | 10-2013-0024074 A | 3/2013 |
| KR | 10-2013-0024346 A | 3/2013 |
| RU | 2347258 C2 | 2/2009 |
| RU | 2363039 C2 | 7/2009 |
| RU | 2408923 C2 | 1/2011 |
| WO | 2010/110613 A1 | 9/2010 |
| WO | 2010/144331 A2 | 12/2010 |
| WO | 2012032180 A1 | 3/2012 |
| WO | 2013/022849 A1 | 2/2013 |

OTHER PUBLICATIONS

"Shortcuts with multiple targets," from the Ars Technica online forum, ("Ars Technica post") published in Oct. 2002, available at <URL=https://arstechnica.com/civis/viewtopic.php?f=15&t=771549>, last accessed Jun. 30, 2018.*
Method and System of Icon Shortcut Suites, IP.com No. IPCOM000226414D (Year: 2013).*
Communication dated Sep. 25, 2014, issued by the European Patent Office in counterpart European Application No. 14161980.9.
Communication dated Oct. 9, 2014, issued by the European Patent Office in counterpart European Application No. 14161998.1.
Communication dated Oct. 10, 2014, issued by the European Patent Office in counterpart European Application No. 14161616.9.
Communication dated Nov. 5, 2014, issued by the European Patent Office in counterpart European Application No. 14161672.2.
Communication dated Nov. 6, 2014, issued by the European Patent Office in counterpart European Application No. 14161739.9.
"Private Desktop, Product Information", Tropical Software Website, Jul. 1, 2012, 2 pages total, XP055142907.
"Private Desktop, Screen Shots", Tropical Software website, Jul. 1, 2012, 5 pages total, XP 055142903.
J R Raphael, "Android Power Tip : Put Your Dialer on Your Home Screen (or Lock Screen)", Jan. 15, 2013, 6 pages total, XP 55143362.
Communication dated Aug. 28, 2014 issued by the European Patent Office in counterpart European Patent Application No. 14161672.2.
Communication dated Jun. 26, 2014 issued by the International Searching Authority in counterpart International Patent Application No. PCT/KR2014/002472.
Alexandra Chang; "Up Close with iOS 5: New Gestures"; Macworld; Oct. 14, 2011; 4 total pages; XP055135715.
"Overview of webOS—User Interface"; HP webOS Developer Center; Jan. 13, 2012; 4 total pages; XP055135739.
"HP/Palm WebOS—Multi-tasking Made Easy, Featuring the Palm Pre Plus"; Mar. 19, 2010; 1 total page; XP054975489.
Communication dated Jul. 3, 2014 issued by the International Searching Authority in counterpart International Patent Application No. PCT/KR2014/002481.
Communication dated Jul. 2, 2014 issued by the International Searching Authority in counterpart International Patent Application No. PCT/KR2014/002464.
Communication dated Jul. 2, 2014 issued by the International Searching Authority in counterpart International Patent Application No. PCT/KR2014/002444.
Communication dated Jul. 2, 2014 issued by the International Searching Authority in counterpart International Patent Application No. PCT/KR2014/002443.
Communication dated Aug. 26, 2014 issued by the European Patent Office in counterpart European Patent Application No. 14161621.9.
Communication dated Jul. 3, 2014 issued by the International Searching Authority in counterpart International Patent Application No. PCT/KR2014/002489.
Communication dated Jul. 2, 2014 issued by the International Searching Authority in counterpart International Patent Application No. PCT/KR2014/002462.
Communication dated Oct. 6, 2016, issued by the Russian Patent Office in counterpart Russian Application No. 2015145945.
Communication dated Oct. 6, 2016, issued by the European Patent Office in counterpart European Application No. 14161980.9.
Gina Trapani: "Seven Easy Ways to Integrate Your Google Apps" Sep. 9, 2009, XP055305805, (6 pages total).
Communication dated May 23, 2017, from the Russian Patent Office in counterpart application No. 2015145945/08.
Communication dated Feb. 8, 2017, issued by the Federal Service on Intellectual Property in counterpart Russian Patent Application No. 2015145969.
Communication dated Feb. 21, 2017, issued by the European Patent Office in counterpart European Patent Application No. 14161998.1.
Communication dated Jan. 17, 2018, from the State Intellectual Property Office of People's Republic of China in counterpart Application No. 201410118879.X.
Communication dated Feb. 24, 2018, from the State Intellectual Property Office of People's Republic of China in counterpart Application No. 201410138255.4.
Communication dated Mar. 2, 2018, from the State Intellectual Property Office of People's Republic of China in counterpart Application No. 201410120447.2.
Communication dated Mar. 2, 2018, from the State Intellectual Property Office of People's Republic of China in counterpart Application No. 201410120439.8.
Communication dated Oct. 24, 2017, from the European Patent Office in counterpart European Application No. 14161998.1.
Communication dated Nov. 14, 2017, from the State Intellectual Property Office of People's Republic of China in counterpart Application No. 201410120449.1.
Communication dated Jan. 4, 2018, from the State Intellectual Property Office of People's Republic of China in counterpart Application No. 201410119872.X.
Communication dated Sep. 10, 2018, issued by the State Intellectual Property Office of the People's Republic of China in counterpart Chinese Patent Application No. 201410118879.X.
Communication dated Nov. 2, 2018, issued by the State Intellectual Property Office of the People's Republic of China in counterpart Chinese Patent Application No. 201410120447.2.
Communication dated Nov. 27, 2018, issued by the State Intellectual Property Office of P.R. China in counterpart Chinese Application No. 201410120439.8.
Communication dated Mar. 15, 2019 issued by the State Intellectual Property Office of P.R. China in counterpart Chinese Application No. 201410118879.X.
Communication dated Mar. 13, 2019 issued by the European Intellectual Property Office in counterpart European Application No. 14 161 672.2.
Stieben, "4 Creative Multitasking Apps for Android", Mar. 2013, pp. 1-3, 3 pages total, XP055566035, https://www.makeuseof.com/tag/4-creative-multitasking-apps-for-android/.

(56) References Cited

OTHER PUBLICATIONS

Evans, "Best task switchers and multitasking apps for Android", Aug. 2012, 15 pages total, XP055566247, https://www.androidauthority.com/best-task-switchers-multitasking-apps-android-110359/.
Communication dated Jul. 3, 2019, issued by the European Patent Office in counterpart European Application No. 14161621.9.
Anonymous, "How to Move/Re-arrange Icons/Apps—Apple iPhone 5", Nov. 24, 2012, XP054979475, retrieved from: URL:https://www.youtube.com/watch?v=oqiY7I3VyXOw, (1 page total).
Communication dated Oct. 9, 2019 issued by the State Intellectual Property Office of P.R. China in counterpart Chinese Application No. 201410120447.2.
Communication dated Dec. 4, 2019 issued by the Korean Intellectual Property Office in counterpart Korean Application No. 10-2013-0089825.
Communication (KR OA) dated Dec. 26, 2019 by the Korean Intellectual Property Office in counterpart Korean Patent Application No. 10-2013-0092242.
Communication (KR OA) dated Jan. 28, 2020 by the Korean Intellectual Property Office in counterpart Korean Patent Application No. 10-2013-0081785.
Communication (KR OA) dated Jan. 31, 2020 by the Korean Intellectual Property Office in counterpart Korean Patent Application No. 10-2013-0084934.
Communication (IN OA) dated Jan. 27, 2020 by the Intellectual Property of India in counterpart Indian Patent Application No. 3039/MUMNP/2015.
Communication (IN OA) dated Jan. 31, 2020 by the Intellectual Property of India in counterpart Indian Patent Application No. 2999/MUMNP/2015.
Communication (IN OA) dated Feb. 17, 2020 by the Intellectual Property of India in counterpart Indian Patent Application No. 3048/MUMNP/2015.

* cited by examiner (a)          (b)

FIG. 3

| INTEREST OBJECT 30 | CATEGORY 32 | METADATA ITEM 34 | META DATA 36 | ASSOCIATED APPLICATION 38 |
|---|---|---|---|---|
| AAA | PEOPLE | USER | NAME, SNS ID, ⋯ | PHONEBOOK APPLICATION, MESSENGER APPLICATION, SNS APPLICATION, CONTENT SHARING APPLICATION |
| | | PHONE | 010-1234-5678, 010-5678-1234, ⋯ | |
| | | E-MAIL | abcd@abc.com, efgh@ddd.com, ⋯ | E-MAIL APPLICATION |
| BBB | LOCATION | LOCATION | AREA NAME, GPS VALUE | WEATHER APPLICATION, CLOCK APPLICATION, MAP APPLICATION, NAVIGATION APPLICATION |
| CCC | MEDIA | MUSIC | SONG TITLE, ARTIST'S NAME | MUSIC APPLICATION |
| | | MOVIE | MOVIE TITLE, DIRECTOR NAME, ACTOR NAME, ⋯ | VIDEO APPLICATION |
| DDD | SEARCH | NEW | KEYWORD VALUE | SEARCH APPLICATION, WEB BROWSER |
| | | BOOKS | KEYWORD VALUE | BOOK APPLICATION |
| | | SHOPPING | KEYWORD VALUE | PRICE-COMPARISON APPLICATION |
| ⋮ | | ⋮ | ⋮ | ⋮ |

METHOD AND DEVICE FOR EXECUTING APPLICATION USING ICON ASSOCIATED WITH APPLICATION METADATA

CROSS-REFERENCE TO RELATED APPLICATIONS

This application claims the benefit of U.S. Provisional Patent Application No. 61/805,632, filed on Mar. 27, 2013, in the U.S. Patent and Trademark Office, and priority from Korean Patent Application No. 10-2013-0092242, filed on Aug. 2, 2013, in the Korean Intellectual Property Office, the disclosures of which are incorporated herein by reference in their entireties.

BACKGROUND

1. Field

Methods and apparatuses consistent with exemplary embodiments relate to a method and device for executing an application related to an object displayed on a screen of the device.

2. Description of the Related Art

Due to the development in multimedia technology and data processing technology, a device is able to simultaneously execute many applications and process various types of information. However, because the device is able to simultaneously execute many applications, it is difficult for a user to easily select an application to be used from among the simultaneously executed applications, and to select a function to be used from among various functions of the selected application.

To allow the user to efficiently obtain information in which the user is interested, there is a demand for an application execution technique capable of effectively executing an application related to a user's interest and efficiently providing an execution result about the user's interest via the executed application.

SUMMARY

One or more exemplary embodiments include a method and device for displaying an execution result of an application, so that an associated application related to an interest object may be efficiently executed by using metadata matching the interest object that is displayed on a screen of the device.

Additional aspects will be set forth in part in the description which follows and, in part, will be apparent from the description, or may be learned by practice of the exemplary embodiments.

According to an aspect of an exemplary embodiment, there is provided a method of displaying an execution result of an application on a screen of a device, the method including displaying an interest object on the screen of the device, in response to selection of the interest object; obtaining metadata matched with the interest object; determining an associated application associated with the interest object; executing the associated application by using the metadata as an input value to the associated application; and displaying, on the screen, a window indicating an execution result of the associated application executed by using the metadata.

The associated application may be associated with the interest object according to at least one of a category of the interest object, a metadata item of the interest object, and metadata of the interest object.

The method may further include an operation of matching the interest object with at least one function from among a plurality of functions of the associated application, and the operation of executing the associated application may include an operation of executing the at least one function that is matched with the interest object.

The at least one function of the associated application may be matched with the metadata and the interest object, and when the interest object is selected, the operation of executing may include an operation of executing the associated application that is matched with the metadata and the interest object.

Once the interest object is selected, the execution result of the associated application may be updated.

The execution result of the associated application may be displayed on the window in real-time.

The metadata may be updated according to a preset period.

A user interface may be provided to match the associated application with the interest object, and the associated application may be matched with the interest object based on a user input via the user interface.

A partial area may be selected from an entire area of an executed screen of the associated application based on a user input, and the selected partial area may be matched with the interest object.

The interest object may be displayed on a lock screen of the device, and in response to selection of the interest object displayed on the lock screen, the device may be unlocked, and the associated application matching the interest object may be executed.

The interest object may be displayed on at least one of a lock screen, a home screen, and an application screen of the device, and based on a user input, the interest object may be moved between the lock screen, the home screen, and the application screen.

A category of the interest object may include at least one of the user, a location, a media, and a keyword.

When the execution result of the associated application is updated, an image of the interest object may be changed.

According to an aspect of an exemplary embodiment, there is provided a device including a memory configured to store at least one program for a method of displaying an execution result of an application on a screen of the device; and a processor configured to execute the at least one program, wherein the method includes displaying an interest object on the screen of the device; in response to selection of the interest object by a user of the device, obtaining metadata matched with the interest object; determining an associated application associated with the interest object; executing the associated application by using the metadata as an input value to the associated application; and displaying, on the screen, a window indicating an execution result of the associated application executed by using the metadata.

The associated application may be associated with the interest object according to at least one of a category of the interest object, a metadata item of the interest object, and metadata of the interest object.

The method may further matching the interest object and at least one function from among a plurality of functions of the associated application, and the operation of executing the associated application may include an operation of executing the at least one function that is matched with the interest object.

The at least one function of the associated application may be matched with the metadata and the interest object, and in response to selection of the interest object, the operation of executing may include an operation of executing the associated application that is matched with the metadata and the interest object.

Once the interest object is selected, the execution result of the associated application may be updated.

The execution result of the associated application may be displayed on the window in real-time.

The metadata may be updated according to a preset period.

A user interface may be provided to match the associated application with the interest object, and the associated application may be matched with the interest object based on a user input via the user interface.

A partial area may be selected from an entire area of an executed screen of the associated application based on a user input, and the selected partial area may be matched with the interest object.

The interest object may be displayed on a lock screen of the device, and in response to selection of the interest object displayed on the lock screen, the device may be unlocked, and the associated application matching the interest object may be executed.

The interest object may be displayed on at least one of a lock screen, a home screen, and an application screen of the device, and based on a user input, the interest object may be moved between the lock screen, the home screen, and the application screen.

A category of the interest object may include at least one of the user, a location, a media, and a keyword.

Once the execution result of the associated application is updated, an image of the interest object may be changed.

According to an aspect of an exemplary embodiment, there is provided a non-transitory computer-readable recording medium having recorded thereon a program for executing the method.

BRIEF DESCRIPTION OF THE DRAWINGS

The above and/or other aspects will become apparent and more readily appreciated from the following description of the embodiments, taken in conjunction with the accompanying drawings in which:

FIG. 3 illustrates an example of a table with respect to metadata and an associated application that are related to an interest object;

DETAILED DESCRIPTION

Figure 1:
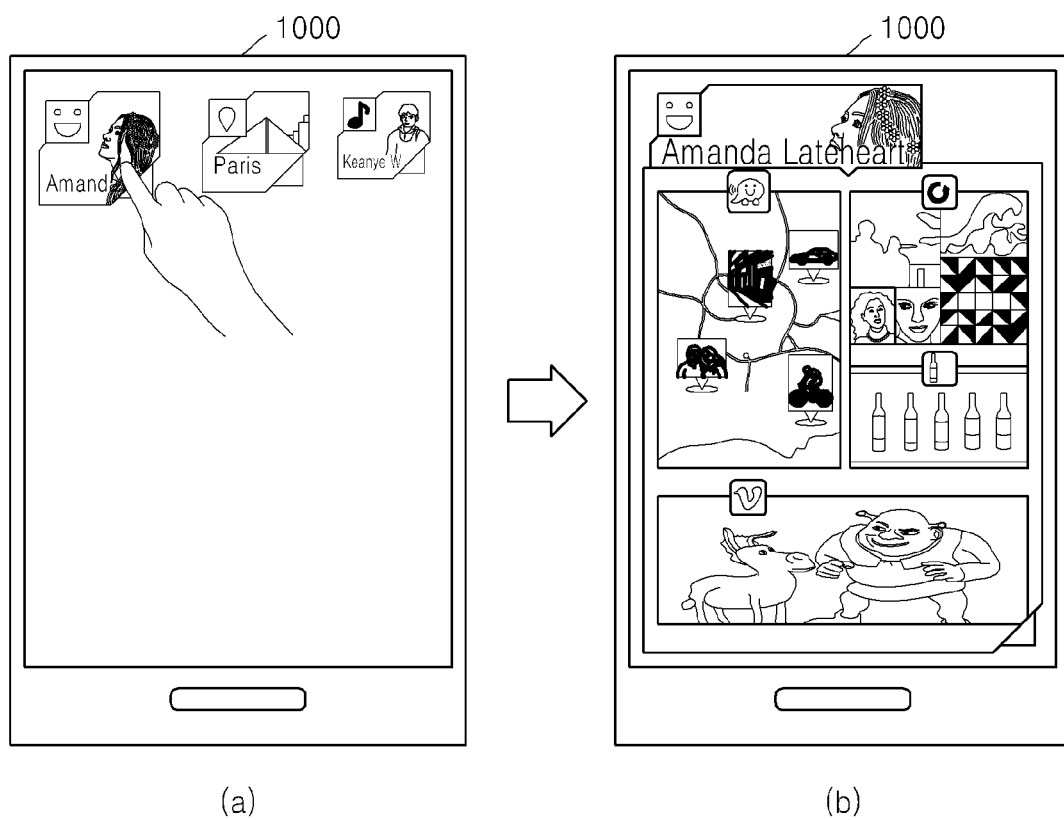
FIG. 1 is a diagram illustrating a method of displaying an execution result of an associated application related to an interest object, according to an exemplary embodiment.

Hereinafter, exemplary embodiments will be described more fully with reference to the accompanying drawings. However, the exemplary embodiments may be embodied in many different forms and should not be construed as being limited to the exemplary embodiments set forth herein; rather, these exemplary embodiments are provided so that this disclosure will be thorough and complete, and will fully convey the concepts of this disclosure to those of ordinary skill in the art. In the following description, well-known functions or constructions will not be described in detail to avoid obscuring the exemplary embodiments with unnecessary detail. Also, throughout the specification, like reference numerals in the drawings denote like elements.

Throughout the specification, it will also be understood that when an element is referred to as being "connected to" another element, the element may be directly connected to another element, or electrically connected to the other element, while intervening elements may also be present.

Throughout the specification, the term "interest object" indicates an object displayed on a screen of a device for executing an application according to information in which the user is interested. For example, the interest object may include at least one of an image, an icon, and text.

In the specification, the interest object may be classified according to categories. For example, the categories of the interest object may include, but are not limited to, 'Person', 'Location', 'Media', and 'Search'. Also, one interest object may be associated with at least one category.

Throughout the specification, the term "metadata related to an interest object" indicates data in which the user is interested that is related to the interest object. The metadata related to the interest object may be, but is not limited to, a value that is input by a user. The metadata related to the interest object may include a sensing value obtained by the device by using a sensor in the device, and various types of data obtained by the device from an external device or an external server.

Throughout the specification, the term "associated application matching an interest object" indicates an application that is executed in response to selection of the interest object. One interest object may match at least one associated application. Also, in response to selection of the interest object, a device may execute the associated application based on metadata of the selected interest object.

Throughout the specification, the term "lock-screen" indicates a software screen for unlocking a device. When the device receives an appropriate user input for unlocking the device displaying the lock-screen, the device may be unlocked.

Also, the term "home screen" indicates, from among software screens of the device, a main screen that controls a preset operation of the device, or executes a preset application from among applications installed in the device and controls the preset application. The home screen may display icons of some applications from among the applications installed in the device, application execution results, etc.

Also, the term "application screen" indicates a software screen including a list of the applications installed in the device. The application screen may include icons of all applications installed in the device. Also, a user may select an icon displayed on the application screen to execute an application of the selected icon or to move the selected icon to the home screen.

Expressions such as "at least one of," when preceding a list of elements, modify the entire list of elements and do not modify the individual elements of the list.

Hereinafter, exemplary embodiments will be described more fully with reference to the accompanying drawings.

FIG. 1 is a diagram illustrating a method of displaying an execution result of an associated application related to an interest object, according to an exemplary embodiment.

Referring to FIG. 1(a), interest objects may be displayed on a screen of the device 1000, and a user may touch an area of the screen of the device at which one of the interest objects is displayed. The interest object may be an icon including text and an image, but one or more exemplary embodiments are not limited thereto.

Referring to FIG. 1(b), in response to a user selecting one of the interest objects displayed on the screen of the device 1000, the device 1000 may obtain metadata related to the selected interest object, and may execute one or more associated applications related to the selected interest object based on the metadata. Also, the device 1000 may display, on the screen of the device 1000, a window that displays real-time execution results of the associated applications. The window that displays real-time execution results of the associated applications may include a plurality of sub-windows. Also, each of the sub-windows may display an execution result with respect to a partial area selected from a whole area of an executed screen of the associated application.

Figure 2:
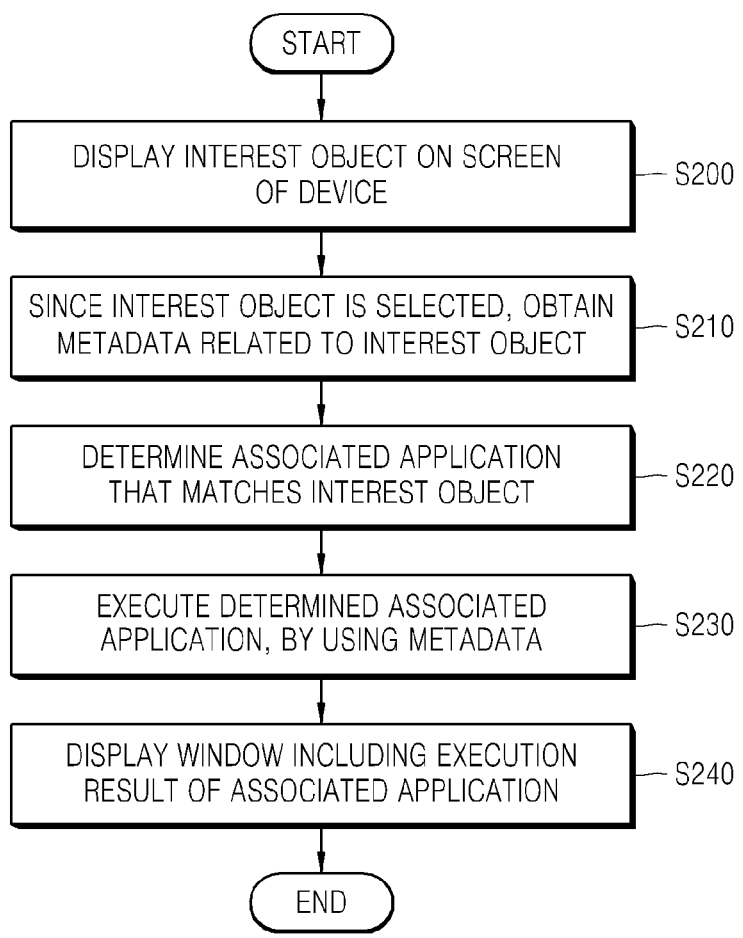
FIG. 2 is a flowchart of a method of executing an associated application related to an interest object and displaying a result of executing the associated application, according to an exemplary embodiment.

FIG. 2 is a flowchart of a method of executing an associated application related to an interest object and displaying a result of executing the associated application, according to an exemplary embodiment.

In operation S200, the device 1000 displays an interest object on a screen of the device 1000. The interest object may be previously generated by the device 1000, and an associated application and metadata that are related to the interest object may be previously set.

The interest object may include at least one of text, an icon, and an image. For example, if the interest object is used to provide information about a location 'Paris' to a user, the interest object may be an icon related to location information, a picture of Paris, and a text "Paris".

The interest object may be displayed on at least one of a lock screen, a home screen, and an application screen of the device 1000. In this case, the device 1000 may previously set on which of the lock screen, the home screen, and the application screen the interest object will be displayed. Also, the device 1000 may move the interest object between the lock screen, the home screen, and the application screen.

In operation S210, in response to selection of the interest object, the device 1000 obtains metadata related to the interest object. The device 1000 may previously set metadata items related to the interest object. The metadata related to the interest object may be updated according to a preset period.

When the interest object is selected, the device 1000 may check the metadata items related to the interest object, and may collect real-time values of the metadata. In this case, the metadata may be a plurality of pieces of data about the device 1000 and a current situation of the device 1000. For example, the metadata may include, but is not limited to, a plurality of pieces of data indicating a location of the device 1000, an application executed in the device 1000, a schedule of the user of the device 1000, a temperature, and a time.

In case the category of the interest object indicates 'People', metadata items related to the interest object may include 'User', 'Phone', and 'e-mail'. Also, the device 1000 may obtain, as a metadata value of the metadata item 'User', a name of another user, and a social networking service identification (SNS ID) of the other user. Also, the device 1000 may obtain a phone number of the other user, as a metadata value of the metadata item 'Phone'.

In case the category of the interest object indicates 'Location', a metadata item related to the interest object may include 'Location'. In this case, the device 1000 may obtain a global positioning system (GPS) value of a current location of the device 1000, as a metadata value of the metadata item 'Location'.

However, one or more exemplary embodiments are not limited thereto, and the metadata related to the interest object may not be collected in real-time. For example, the metadata related to the interest object may be a fixed value that was previously input by the user.

Regardless whether the interest object is selected, the device 1000 may update the metadata according to a preset period. In this case, the device 1000 may execute a function of collecting the metadata in a background of the device 1000. Also, when an interest object is generated, a function of collecting metadata related to the interest object may be automatically activated.

In operation S220, the device 1000 determines an application that matches the interest object. When the device 1000 generates the interest object, the device 1000 may associate the application and the interest object. Alternatively, once the interest object is selected, the device 1000 may determine the associated application that matches the interest object.

The associated application may automatically match the interest object, based on at least one of a category of the interest object, metadata items related to the interest object, and the metadata. For example, in case the category of the interest object indicates 'People', and the metadata items related to the interest object correspond to 'User' and 'Phone', a phonebook application, a messenger application, and an SNS application may be determined to match the interest object. As another example, in case the category of the interest object indicates 'People', and the metadata item related to the interest object corresponds to 'e-mail', an e-mail application may be determined to match the interest object.

The associated application may match the interest object, based on a user input. If the device 1000 generates the interest object, the device 1000 may display a list of associated applications to be selected by the user, and may match the interest object with at least one application that is selected by the user. In this case, the list of the associated applications may include titles of the associated applications recommended by the device 1000, based on the category of the interest object, the metadata item related to the interest object, and the metadata.

In operation S230, the device 1000 executes the associated application determined in operation S220, by using the metadata. The device 1000 may execute the associated application determined in operation S220, by using the metadata as an input value to the application. For example, if the metadata of the interest object corresponds to "010-1234-5678", and the associated application related to the interest object include the phonebook application and the messenger application, and the device 1000 may execute the phonebook application and the messenger application and may input the metadata "010-1234-5678" to the phonebook application and the messenger application. Also, the device 1000 may search for content information in the associated application, by using the metadata as the input value to the application. Also, the device 1000 may search for a function menu of the associated application, by using the metadata as the input value.

Also, at least one function from among functions of the associated application may be preset to be executed according to in response to selection of the interest object. In this case, the device 1000 may execute only the at least one preset function of the associated application.

In operation S240, the device 1000 displays a window indicating a result of executing the associated application. The device 1000 may execute a plurality of associated applications and may display, on a screen of the device 1000, a window including a plurality of sub-windows that indicate results of executing the plurality of associated applications, respectively. For example, if the associated applications related to the interest object correspond to the phonebook application and the messenger application, the device 1000 may execute the phonebook application and the messenger application, and may display a window including sub-windows indicating results of executing the phonebook application and the messenger application, respectively.

Also, at least one function from among the functions of the associated application may be preset to be executed according to selection of the interest object. In this case, the device 1000 may generate a sub-window indicating result of executing the at least one preset function of the associated application.

Sizes of the sub-window and the window may be adjusted according to the number of associated applications, and an amount of data included in the execution result of the associated application. Alternatively, the sizes of the sub-window and the window may be adjusted based on a drag input by the user.

The execution result of the associated application may include data executed in the device 1000, data received from another device via a network, and data collected through the World Wide Web or Internet (hereinafter, the web).

FIG. 3 illustrates an example of a table with respect to metadata and an associated application that are related to an interest object.

Referring to FIG. 3, the table including information about the metadata and the associated application that are related to the interest object may include an interest object field 30, a category field 32, a metadata item field 34, a metadata field 36, and an associated application field 38.

In the interest object field 30, ID values of interest objects may be recorded. Also, in the interest object field 30, a plurality of pieces of link information used to retrieve the interest objects from a memory may be recorded.

In the category field 32, a category of an interest object may be recorded. The category of the interest object may include, but is not limited to, 'People', 'Location', 'Media', and 'Search'.

In the metadata item field 34, metadata items related to the interest object may be recorded. For example, if the category of the interest object indicates 'People', the metadata item related to the interest object may include 'User', 'Phone', and 'e-mail'. As another example, if the category of the interest object indicates 'Location', the metadata item of the metadata related to the interest object may include 'location'. As another example, if the category of the interest object indicates 'Media', the metadata item related to the interest object may include 'Music' and 'Movie'. As another example, if the category of the interest object indicates 'Search', the metadata item related to the interest object may include 'News', 'Books', and 'Shopping'.

In the metadata field 36, a plurality of pieces of metadata according to the metadata items, which are obtained by the device 1000, may be recorded. For example, if the metadata item indicates 'User', the metadata may include a name and an SNS ID of another user. As another example, if the metadata item corresponds to 'Phone', the metadata may include a phone number of the other user. As another example, if the metadata item corresponds to 'e-mail', the metadata may include an e-mail address of the other user.

If the metadata item corresponds to 'location', the metadata may include an area name and a GPS value indicating a location of the device 1000. If the metadata item corresponds to 'Music', the metadata may include a song title and an artist's name.

If the metadata item corresponds to 'News', 'Books', or 'Shopping', the metadata may include a predetermined keyword value.

One or more values of the metadata recorded in the metadata field 36 may be fixed values that are preset by the user. However, the exemplary embodiments are not limited thereto, and the values of the metadata recorded in the metadata field 36 may be obtained in real-time by the device 1000. For example, if the category of the interest object indicates 'People', the device 1000 may record a name, an SNS ID, a phone number, and an e-mail address of another user who the user frequently contacts in the metadata field 36. As another example, if the category of the interest object indicates 'Location', the device 1000 may obtain in real-time a GPS value indicating a current location of the device 1000, and may record the GPS value in the metadata field 36.

As another example, if the category of the interest object indicates 'Media', the device 1000 may determine music or a movie to be recommended to the user, based on information about music or a movie that the user frequently or recently reproduces. The device 1000 may record metadata about the determined music and movie to be recommended, in the metadata field 36. In this case, the information about the music or the movie that the user frequently or recently reproduces may include information about a genre, a director, actors or actresses, etc. of the music or the movie, and context information (e.g., a location, a temperature, a time, etc.) in which the user reproduces the music or the movie.

If the category of the interest object indicates 'Search', the device 1000 may record a keyword about a user's recent interest in the metadata field 36. In this case, the keyword to be recorded in the metadata field 36 may be determined based on a call history of the user, a search history of the user, a content usage history of the user or a shopping history of the user. The keyword may be input to the associated application (e.g., a search application, a web browser, a book application, a price-comparison application, etc.) and thus may be used by the device 1000 in searching predetermined information. Also, a category value of the keyword may be input to the associated application.

In the associated application field 38, a type or an ID value of the associated application corresponding to the interest object may be recorded. Also, in the associated application field 38, at least one of the category of the interest object, the metadata item of the interest object, and the metadata of the interest object, and the associated application related to the interest object may be recorded.

For example, if the category of the interest object indicates 'People', and the metadata item of the interest object indicates 'User' or 'Phone', a phonebook application, a messenger application, an SNS application, and a content sharing application may be recorded in the associated application field 38. If the category of the interest object indicates 'Location', an application using location information may be recorded in the associated application field 38. For example, a weather application, a clock application, a map application, and a navigation application may be recorded in the associated application field 38.

The associated application related to the interest object may be set by the user, but one or more exemplary embodiments are not limited thereto. The device 1000 may recommend the associated application, based on the category of the interest object, the metadata item of the interest object, and the metadata of the interest object. Alternatively, the device 1000 may select some of associated applications recommended by the user.

At least one function from among the functions of the associated application may match the interest object. For example, from among functions of the messenger application, a function for chatting with a device of a particular user may match the interest object. In this case, a chat window for chatting with the particular user may be included, as an execution result of the messenger application, in a window.

For example, a partial area from an executed screen of the associated application, which is selected by the user, may match the interest object. In this case, an execution result displayed on the partial area selected by the user may be included, as an execution result of the associated application, in a window.

Figure 4:
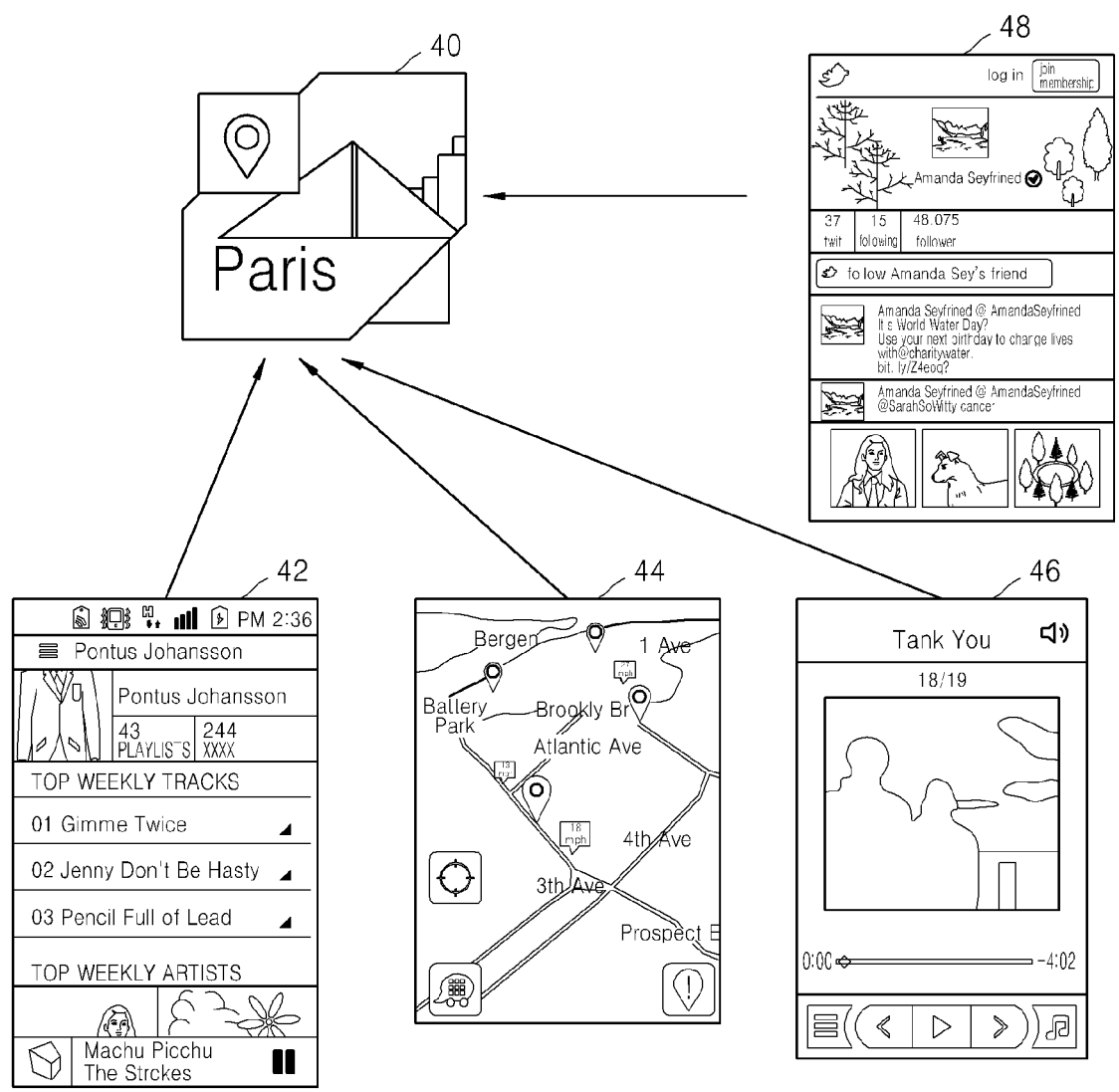
FIG. 4 illustrates an interest object and associated applications related to the interest object, according to an exemplary embodiment.

FIG. 4 illustrates an interest object 40 and associated applications 42, 44, 46, and 48 related to the interest object 40, according to an exemplary embodiment.

Referring to FIG. 4, the interest object 40 may match the associated applications 42, 44, 46, and 48. The interest object 40 may be displayed on a screen of the device 1000 to help a user obtain information related to a location 'Paris'.

A category of the interest object 40 may indicate 'Location', and the location 'Paris' and 'a GPS value of Paris' correspond to metadata related to the interest object 40. For example, when the interest object 40 is selected, the device 1000 may execute a map application 44, and may mark a location of Paris on a map, which is provided by the map application 44, by using the GPS value of Paris as an input value.

As another example, when the interest object 40 is selected, the device 1000 may execute a music application 46, may scan music related to Paris by using Paris as an input value to a search application for finding the related music, and then may reproduce the music.

Figure 5:
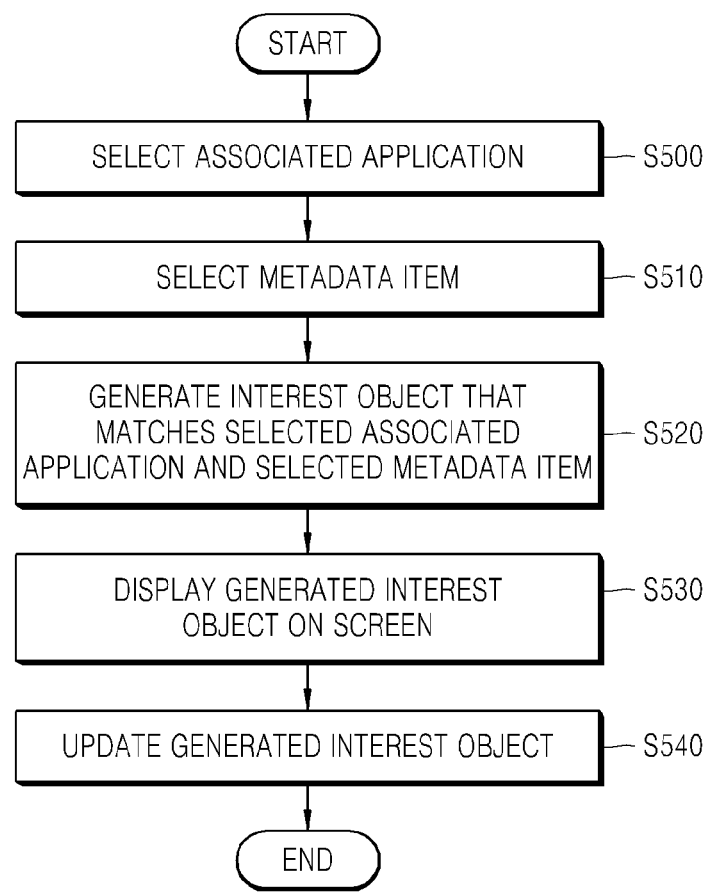
FIG. 5 is a flowchart of a method of generating an interest object, the method performed by the device, according to an exemplary embodiment.

FIG. 5 is a flowchart of a method of generating an interest object, the method performed by the device 1000, according to an exemplary embodiment.

In operation S500, the device 1000 selects an associated application to be matched with the interest object. The device 1000 may select the associated application to be matched with the interest object, based on an executed screen of an application or a user input to the application. For example, when a user touches the icon of the application over a preset period of time, a menu for selecting the associated application may be displayed, and based on a user input to the menu, the device 1000 may set the application as the associated application. As another example, when the user selects a category of the interest object, one or more applications related to the selected category may be recommended by the device 1000, and based on a user input for selecting at least one application from among the one or more recommended applications, the device 1000 may set the associated application. However, one or more exemplary embodiments are not limited thereto, and the device 1000 may provide, to the user, various user interfaces for setting the associated application.

In operation S510, the device 1000 selects one or more metadata items to be matched with the interest object. In response to selection of the associated application, the device 1000 may display a selection menu for selecting metadata items related to the associated application. Based on a user input to the selection menu, the device 1000 may select a predetermined metadata item. For example, when the user selects the category of the interest object, one or more metadata items related to the selected category may be recommended by the device 1000, and based on a user input, the device 1000 may select at least one metadata item from among the one or more recommended metadata items. However, one or more exemplary embodiments are not limited thereto, and the device 1000 may provide, to the user, various user interfaces for setting the metadata items.

In operation S520, the device 1000 generates the interest object that matches the selected associated application and the selected metadata item. The device 1000 may generate the interest object, and may match the interest object with the selected associated application and the selected metadata item.

The interest object may include the icon of at least one associated application related to the interest object. Also, the interest object may include the text indicating at least one of the category of the interest object, the metadata item, and metadata related to the interest object. Also, the interest object may include the image indicating a partial area of an executed screen of the associated application that is executed by using the metadata as an input value. For example, the device 1000 may match the interest object with a phonebook application and a category 'People'.

Also, the device 1000 may match the interest object with the metadata related to the interest object. For example, if the interest object is related to communication with another user "Amanda", the device 1000 may match the interest object with "Amanda" that is a name of the other user. As another example, if the interest object is related to communication with the other user "Amanda", the device 1000 may match the interest object with a phonebook application, a messenger application, and an SNS application.

The device 1000 may store the interest object in a memory of the device 1000. However, one or more exemplary embodiments are not limited thereto, and the device 1000 may store the interest object in another device or an external server. For example, the device 1000 may store the interest object in a service-providing server (not shown), and may receive a service related to the interest object from the service-providing server.

In operation S530, the device 1000 displays the interest object on the screen. The device 1000 may display the interest object on at least one of a lock screen, a home screen, and an application screen. If the interest object displayed on the lock screen is touched by the user, the device 1000 may be unlocked, and the associated application related to the interest object may be executed.

In operation S540, the device 1000 updates the interest object. The metadata matching the interest object, and an execution result of the associated application matching the interest object, may be updated in real-time. Accordingly, the device 1000 may update at least one of the image, the icon, and the text that configure the interest object. For example, if the interest object functions to execute an application related to a current location of the device 1000, an area name of the current location of the device 1000 may be included in the interest object. Also, when the current location of the device 1000 is changed, the area name included in the interest object may be updated. Also, when the execution result of the associated application is updated, the image of the interest object may be changed. For example, the image of the interest object may correspond to an image obtained by capturing a window displaying the execution result of the associated application, and thus, when the execution result of the associated application is updated, the image of the interest object may also be updated.

Figure 6:
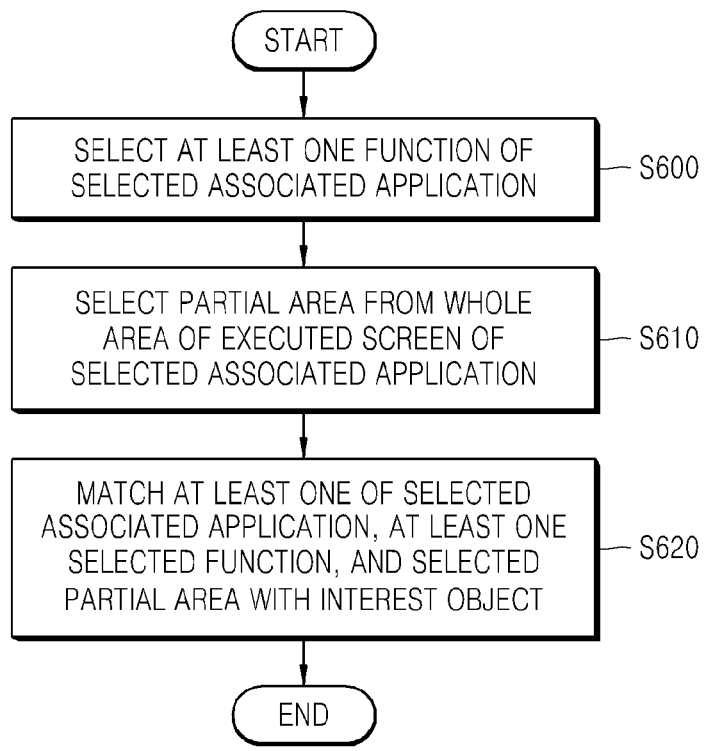
FIG. 6 is a flowchart of a method of matching an interest object with an associated application, the method performed by the device, according to an exemplary embodiment.

FIG. 6 is a flowchart of a method of matching an interest object with an associated application, the method performed by the device 1000, according to an exemplary embodiment.

In operation 5600, the device 1000 selects at least one function of the associated application that is selected by a user. The device 1000 may select the at least one function from among functions of the associated application to match the at least one function with the interest object. For example, if the associated application is a map application that provides a map search function, a bus search function, and a subway search function, the device 1000 may select the map search function of the map application to match the map search function with the interest object.

In operation 5610, the device 1000 selects a partial area from a whole area of an executed screen of the associated application. The device 1000 may select the partial area from the executed screen of the associated application, based on a touch and drag input by the user. For example, if the associated application is the map application, and an executed screen of the map application includes a field for map search, a field for searched map, and a field for additional information about a point of interest (POI) in a map, the device 1000 may select the field for map search in the executed screen of the map application. As another example, if the associated application is a video reproducing application, and an executed screen of the video reproducing application includes an area in which a reproduced video is displayed, and an area in which reproduction of the video is controlled, the device 1000 may select only the area where the reproduced video is displayed.

In operation 5620, the device 1000 matches at least one of the selected associated application, the at least one selected function, and the selected partial area with the interest object. Once the interest object is selected by the user, the whole area or the partial area of the executed screen of the associated application may be displayed, or the at least one selected function of the associated application may be executed.

Figure 7:
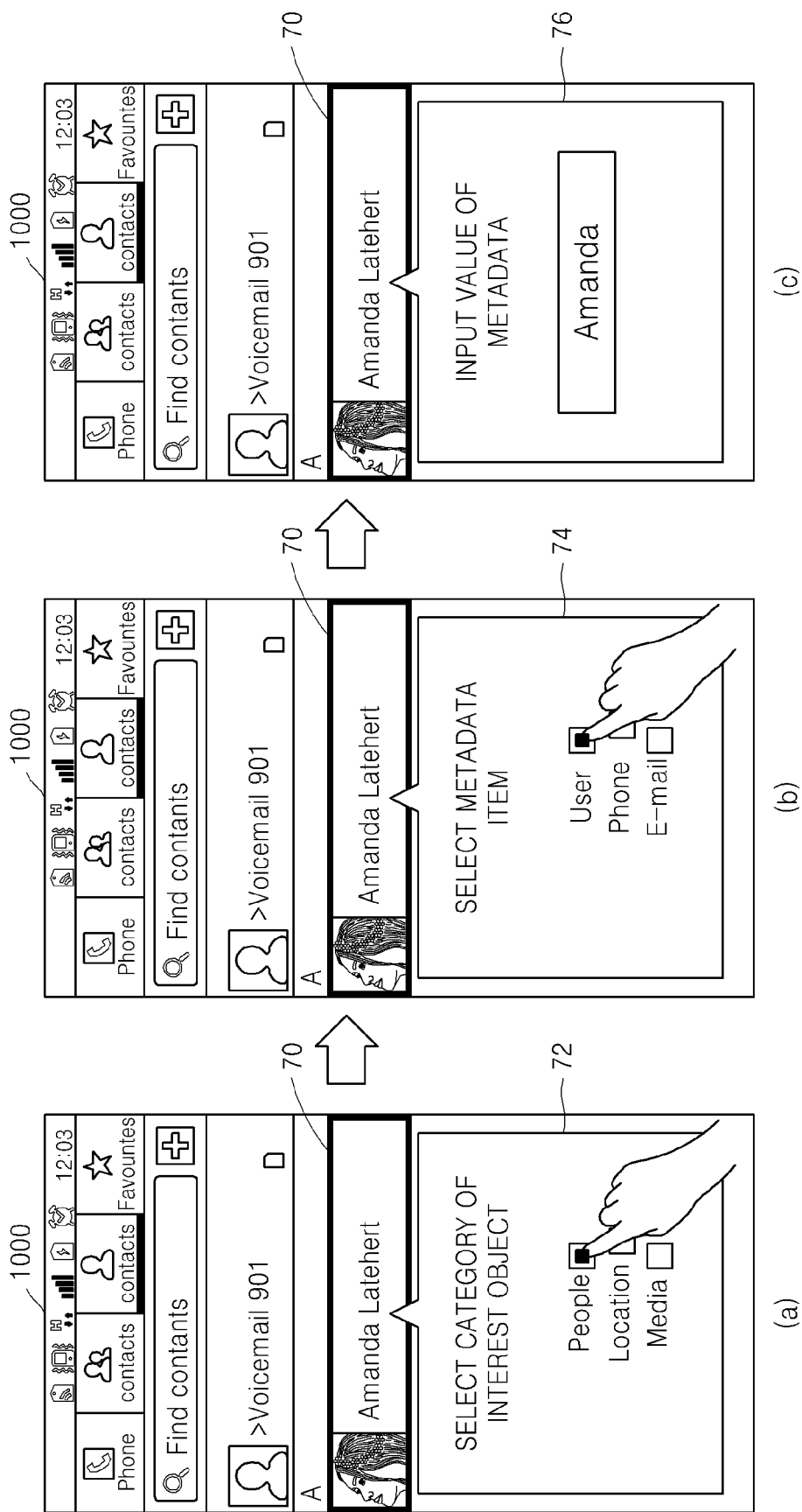
FIG. 7 illustrates an example in which the device matches an associated application and metadata with an interest object, based on a user input, according to an exemplary embodiment.

FIG. 7 illustrates an example in which the device 1000 matches an associated application and metadata with an interest object, based on a user input, according to an exemplary embodiment.

Referring to FIG. 7(*a*), an executed screen of a phonebook application may be displayed on a screen of the device 1000. Based on a touch and drag input by a user, the device 1000 may select a partial area 70 from the executed screen of the phonebook application. Once the partial area 70 is selected, the device 1000 may display a menu 72 for selecting a category of the interest object.

Once a predetermined category (e.g., a category 'People') is selected from the menu 72 for selecting the category of the interest object, as illustrated in FIG. 7(*b*), the device 1000 may display a menu 74 for selecting metadata items of the interest object.

Once a predetermined metadata item (e.g., a metadata item 'User') is selected from the menu 74 for selecting the metadata items of the interest object, as illustrated in FIG. 7(*c*), the device 1000 may display a window 76 for receiving a metadata input. The user may input a name of another user (e.g., a name 'Amanda') to the window 76 for receiving the metadata input.

Accordingly, the device 1000 may generate the interest object that matches the partial area 70 selected from the executed screen of the phonebook application, the category 'People', the metadata item 'User', and the metadata 'Amanda'.

Once the generated interest object is selected, the device 1000 may display a window that corresponds to the partial area 70 selected from the executed screen of the phonebook application. Also, only a necessary function for making a call to Amanda may be activated from among functions of the phonebook application.

Figure 8:
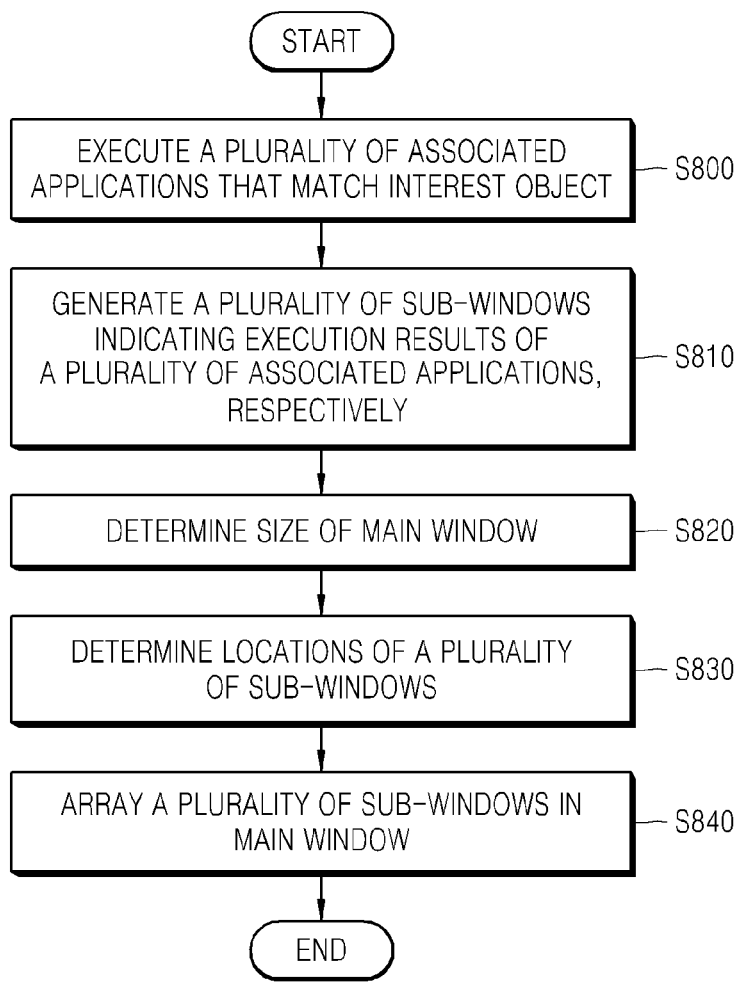
FIG. 8 is a flowchart of a method of generating a window indicating an execution result of an associated application, according to an exemplary embodiment.

FIG. 8 is a flowchart of a method of generating a window indicating an execution result of an associated application, according to an exemplary embodiment.

In operation S800, the device 1000 executes a plurality of associated applications that match an interest object. For example, based on the table shown in FIG. 3, the device 1000 may determine the associated applications matching the interest object, and then may execute the matching associated applications.

If at least one function of an associated application is matched with the interest object, the device 1000 may activate only the at least one function of the associated application. Also, if a partial area of an executed screen of the associated application is matched with the interest object, the device 1000 may activate only a function related to the partial area of the executed screen of the associated application.

In operation S810, the device 1000 generates a plurality of sub-windows indicating execution results of the associated applications, respectively. For example, the device 1000 may determine a size of a sub-window, based on an amount of data included in an execution result of the associated application, and a size of an image indicating the execution result. As another example, the device 1000 may determine the size of the sub-window, based on how often the associated application is executed. However, one or more exemplary embodiments are not limited thereto, and the device 1000 may generate the sub-window indicating the execution result of the associated application, according to the determined size of the sub-window.

In operation S820, the device 1000 determines a size of a main window. The device 1000 may determine the size of the main window, based on the number and size of the sub-windows.

In operation S830, the device 1000 determines locations of the sub-windows. The device 1000 may determine the locations of the sub-windows so that the sub-windows may be arrayed in the main window according to a preset order. For example, based on how often the associated application is executed, the device 1000 may determine at which location the sub-window is to be displayed on a main window.

In operation S840, the device 1000 arrays the sub-windows in the main window. The device 1000 may display the sub-windows at the locations determined in operation S830 on the main window.

Figure 9:
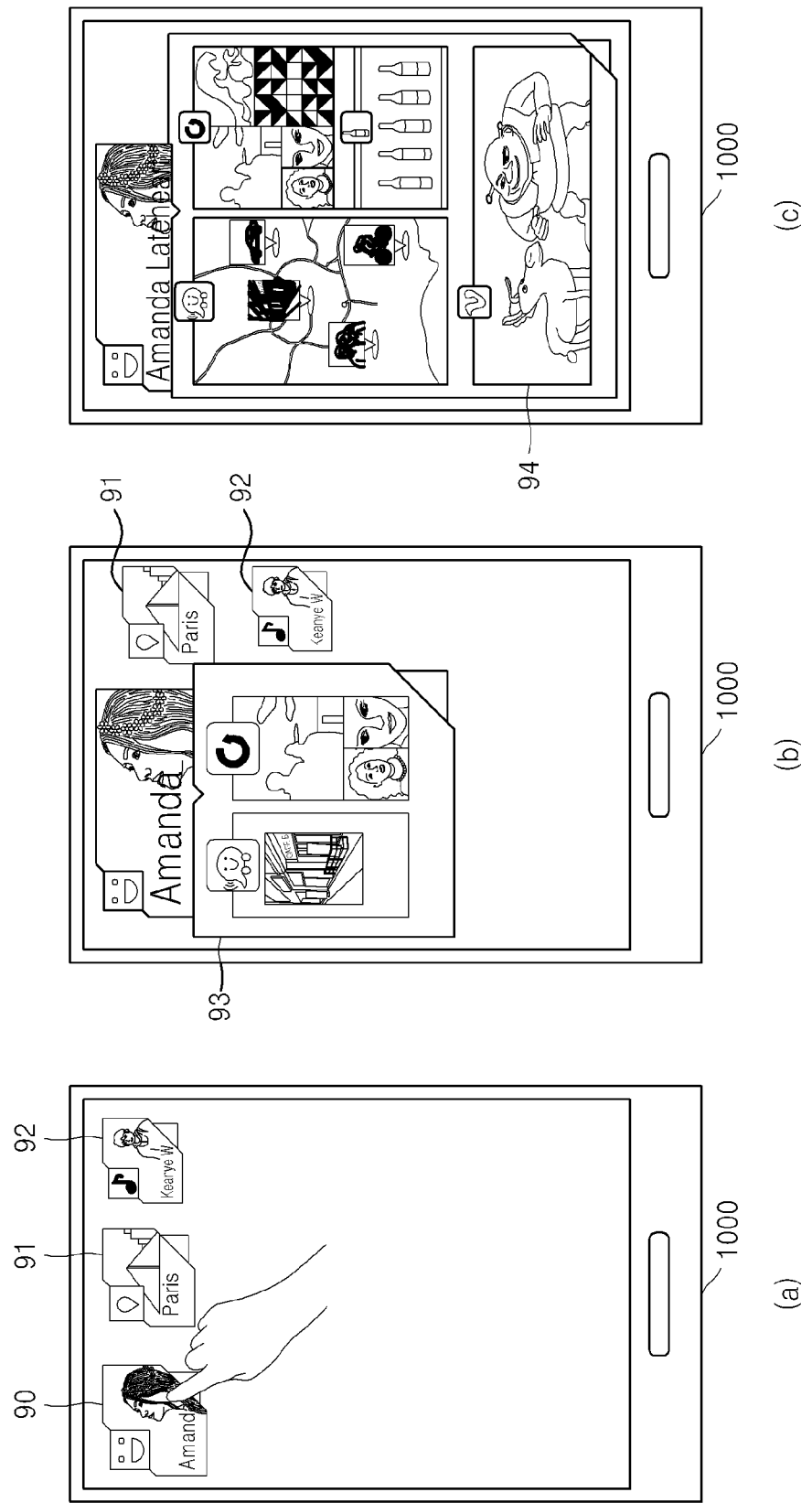
FIG. 9 illustrates an example in which a size of a window indicating an execution result of associated applications is determined, according to the number of associated applications related to an interest object, according to an exemplary embodiment.

FIG. 9 illustrates an example in which a size of a window indicating an execution result of associated applications is determined, according to the number of associated applications related to an interest object, according to an exemplary embodiment.

Referring to FIG. 9(*a*), a first interest object 90, a second interest object 91, and a third interest object 92 may be displayed on a screen of the device 1000. In this regard, a user of the device 1000 may touch an area on the screen of the device 1000 at which the first interest object 90 is displayed.

As illustrated in FIG. 9(*b*), when two associated applications are related to the first interest object 90, a window 93 indicating an execution result of the two associated applications may be displayed on a partial area of the screen of the device 1000. The window 93 indicating the execution result of the two associated applications may include two sub-windows that are arrayed according to a preset standard. Since the first interest object 90 is touched by the user, the execution result of the two associated applications may be updated in real-time.

As illustrated in FIG. 9(*b*), since the window 93 is displayed on the partial area of the screen of the device 1000, locations of the second interest object 91 and the third interest object 92 may be changed. The second interest object 91 and the third interest object 92 may be displayed on an area in a whole area of the screen of the device 1000, wherein the window 93 is not displayed on the area.

When one of the two sub-windows in the window 93 is selected, a screen of the associated application that corresponds to the selected sub-window may be displayed on the whole area of the screen of the device 1000.

As illustrated in FIG. 9(*c*), when four associated applications are related to the first interest object 90, a window 94 indicating an execution result of the four associated applications may be displayed on the whole area of the screen of the device 1000. The window 94 indicating the execution result of the four associated applications may include four sub-windows that are arrayed according to a preset standard.

When one of the four sub-windows in the window 94 is selected, a screen of the associated application that corresponds to the selected sub-window may be displayed on the whole area of the screen of the device 1000.

Figure 10:
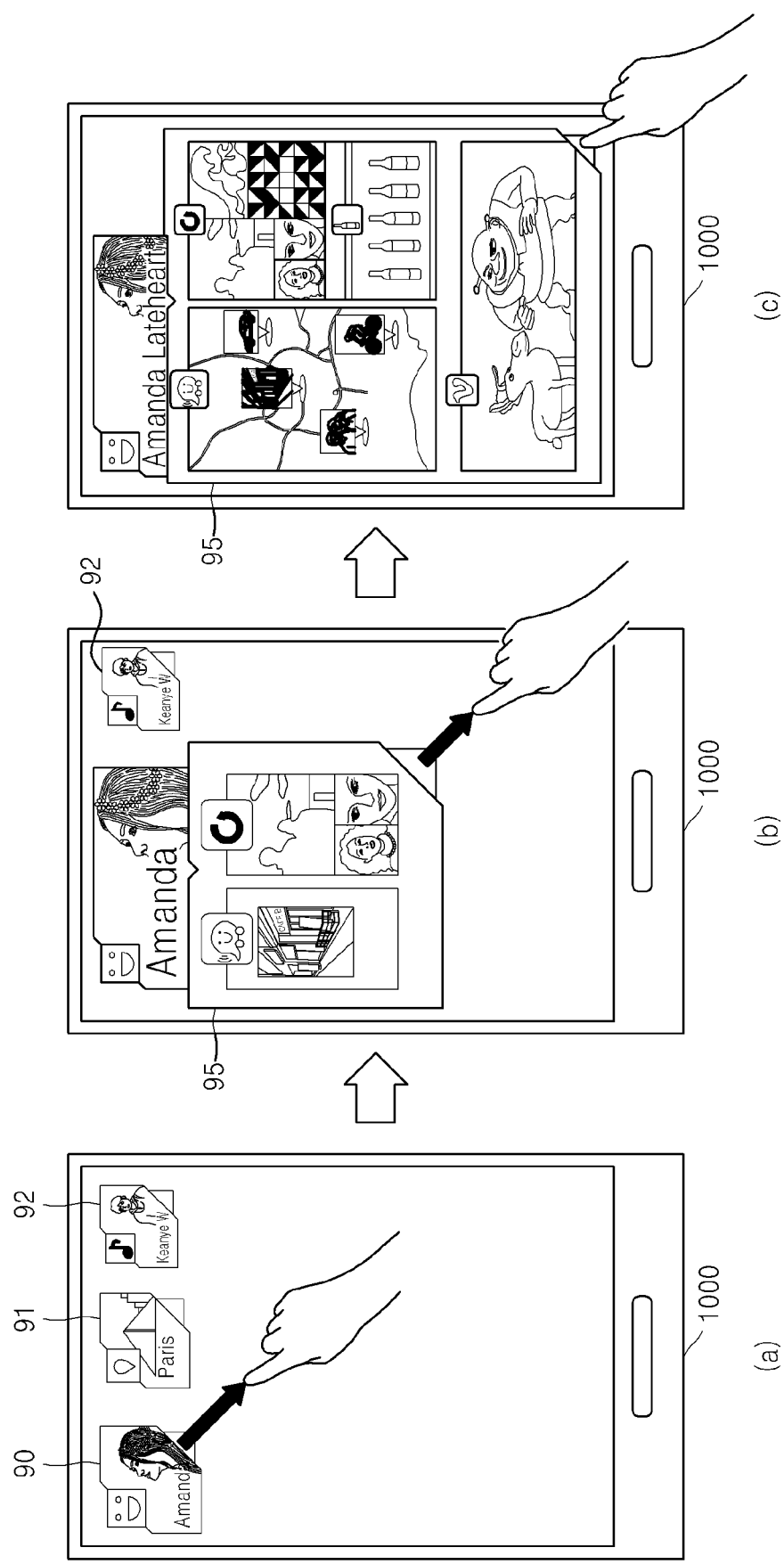
FIG. 10 illustrates an example in which the device adjusts a size of a window indicating an execution result of associated applications, based on a user input, according to an exemplary embodiment.

FIG. 10 illustrates an example in which the device 1000 adjusts a size of a window indicating an execution result of associated applications, based on a user input, according to an exemplary embodiment.

Referring to FIG. 10(*a*), a first interest object 90, a second interest object 91, and a third interest object 92 may be displayed on a screen of the device 1000. In this regard, a user of the device 1000 may interact with the screen of the device 1000 to touch and drag an edge of the first interest object 90. As illustrated in FIGS. 10(*b*) and 10(*c*), when the edge of the first interest object 90 is dragged, a window 95 indicating an execution result of associated applications related to the first interest object 90 may be gradually enlarged.

In more detail, referring to FIG. 10(*b*), since the edge of the first interest object 90 is touched and dragged, an area of the first interest object 90 expands so that the window 95 indicating an execution result of associated applications related to the first interest object 90 may be displayed. The window 95 may be displayed on a partial area of the screen of the device 1000 and then may be gradually enlarged. The window 95 may include two sub-windows that are arrayed according to a preset standard.

Referring to FIG. 10(*c*), since the edge of the first interest object 90 is continuously dragged, a size of the window 95 may be continuously enlarged and then the window 95 may be displayed on a whole area of the screen of the device 1000. The window 95 may include four sub-windows that are arrayed according to a preset standard.

Figure 11:
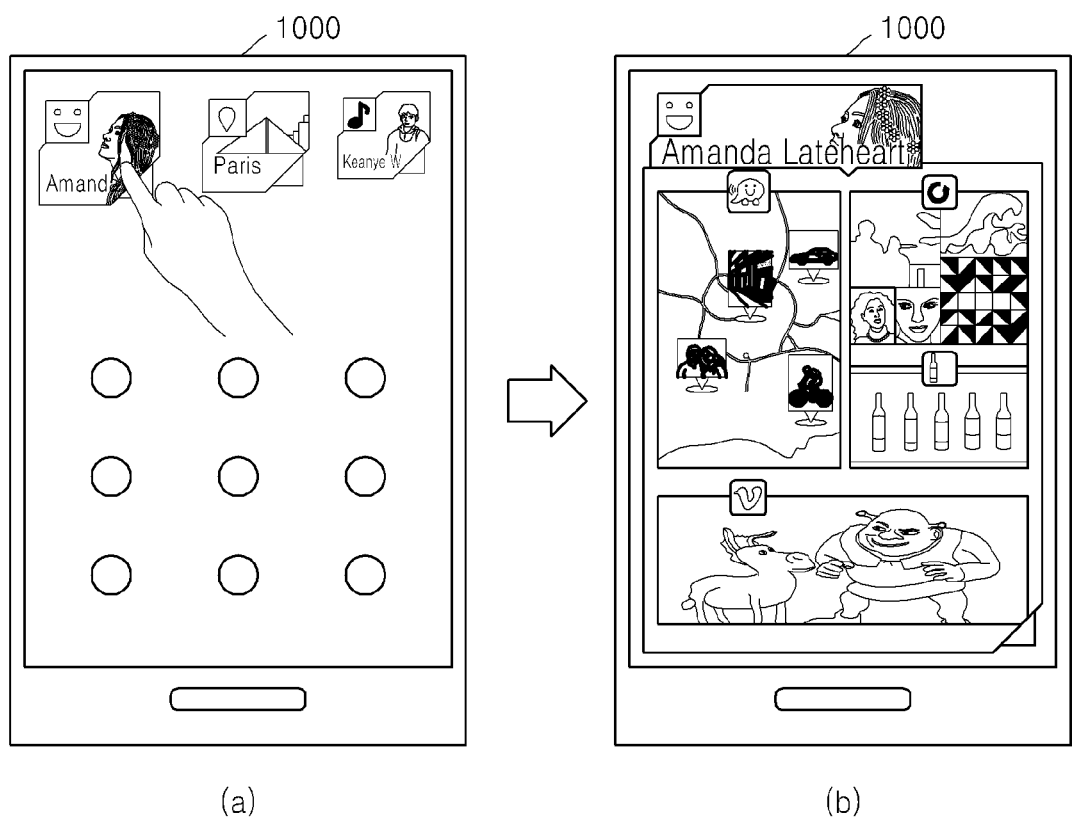
FIG. 11 illustrates an example in which interest objects are displayed on a lock screen, according to an exemplary embodiment.

FIG. 11 illustrates an example in which interest objects are displayed on a lock screen, according to an exemplary embodiment.

Referring to FIG. 11(*a*), a first interest object 90, a second interest object 91, and a third interest object 92 may be displayed on the lock screen of the device 1000. In this regard, a user of the device 1000 may touch a position on the screen of the device 1000 at which the first interest object 90 is displayed.

Referring to FIG. 11(*b*), because the first interest object 90 displayed on the lock screen is selected by the user, the device 1000 may be unlocked and a window indicating an execution result of associated applications related to the first interest object 90 may be displayed on a home screen of the device 1000. Because the first interest object 90 is selected by the user, the execution result of the associated applications may be updated in real-time.

Figure 12:
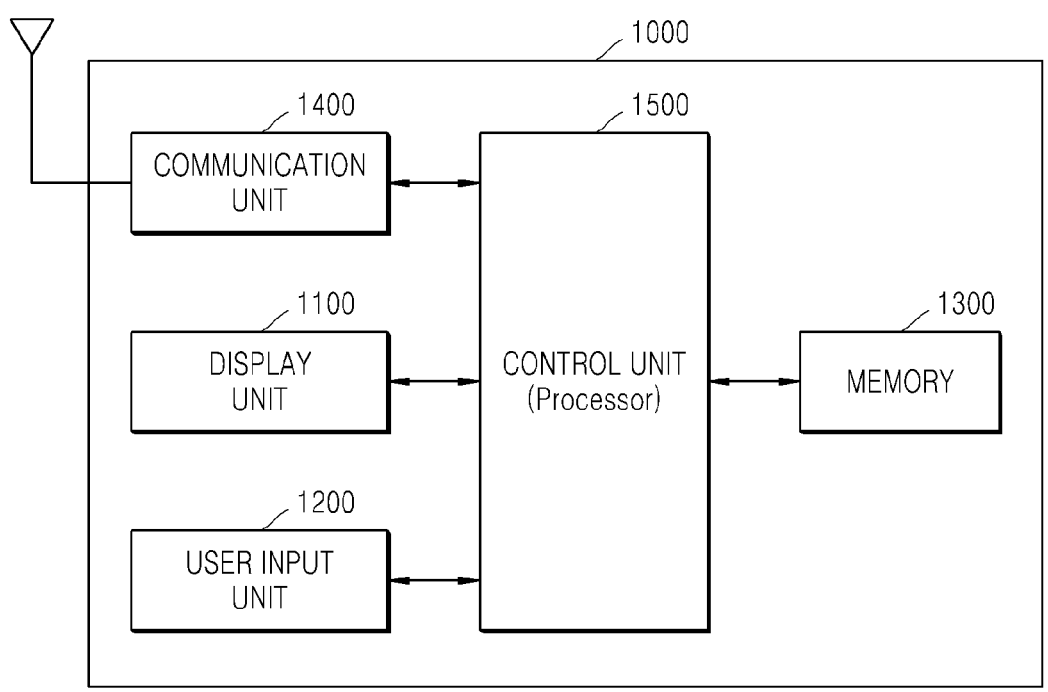
FIG. 12 is a block diagram of the device according to an exemplary embodiment.

FIG. 12 is a block diagram of the device 1000, according to an exemplary embodiment.

As illustrated in FIG. 12, the device 1000 may include a display unit 1100, a user input unit 1200, a memory 1300, a communication unit 1400, and a control unit 1500 (hereinafter, also referred as 'the processor 1500').

The display unit 1100 is controlled by the control unit 1500 and thus displays, on a screen of the device 1000, an interest object and a window indicating an execution result of an associated application related to the interest object.

The user input unit 1200 receives a user input with respect to the device 1000. The user input unit 1200 may receive a user's touch input with respect to the screen of the device 1000 and a user input with respect to a button of the device 1000.

The memory 1300 stores a plurality of pieces of data that are used by the device 1000 in generating the interest object, and displaying the interest object and the window indicating the execution result of the associated application related to the interest object.

The communication unit 1400 exchanges, with an external device (not shown) or an external server (not shown), the plurality of pieces of data that are used by the device 1000 in generating the interest object, and displaying the interest object and the window indicating the execution result of the associated application related to the interest object.

The control unit 1500 controls operations of the device 1000. The control unit 1500 may control the display unit 1100, the user input unit 1200, the memory 1300, and the communication unit 1400 so that the device 1000 may generate the interest object, and may display the interest object and the window indicating the execution result of the associated application related to the interest object on the screen.

In more detail, the control unit 1500 controls the display unit 1100 to display the interest object on the screen of the device 1000. The interest object may be previously generated by the control unit 1500, and the associated application and metadata that are related to the interest object may be preset.

The interest object may include at least one of an image, an icon, and text. For example, if the interest object is used to provide information about a location 'Paris' to the user, the interest object may be configured of an icon indicating that the interest object is about location information, an image of Paris, and a text "Paris".

The interest object may be displayed on at least one of a lock screen, a home screen, and an application screen of the device 1000. In this case, the control unit 1500 may previously set on which screen from among the lock screen, the home screen, and the application screen the interest object will be displayed. Also, the control unit 1500 may move the interest object between the lock screen, the home screen, and the application screen, based on a user input.

Because the interest object is selected, the control unit 1500 obtains metadata related to the interest object. The control unit 1500 may previously set metadata items related to the interest object.

Once the interest object is selected, the control unit 1500 may check the metadata items related to the interest object, and may collect real-time values of the metadata based on the checked metadata items.

In case a category of the interest object indicates 'People', metadata items related to the interest object may include 'User', 'Phone', and 'e-mail'. Also, the control unit 1500 may obtain, as a metadata value of the metadata item 'User', a name of another user, and an SNS ID of the other user. Also, the control unit 1500 may obtain a phone number of the other user, as a metadata value of the metadata item 'Phone'.

In case the category of the interest object indicates 'Location', a metadata item related to the interest object may include 'Location'. In this case, the control unit 1500 may obtain a GPS value of a current location of the device 1000, as a metadata value of the metadata item 'Location'.

However, one or more exemplary embodiments are not limited thereto, and the metadata related to the interest object may not be collected in real-time. For example, the metadata related to the interest object may be a fixed value that was previously input by the user.

The control unit 1500 determines an associated application that matches the interest object. When the control unit 1500 generates the interest object, the control unit 1500 may match the associated application and the interest object. Alternatively, after the interest object is selected, the control unit 1500 may determine the associated application matches the interest object.

The associated application may automatically match the interest object, based on at least one of a category of the interest object, metadata items related to the interest object, and the metadata. For example, in case the category of the interest object indicates 'People', and the metadata items related to the interest object correspond to 'User' and 'Phone', a phonebook application, a messenger application, and an SNS application may match the interest object. As another example, in case the category of the interest object indicates 'People', and the metadata item related to the interest object corresponds to 'e-mail', an e-mail application may match the interest object.

The associated application may match the interest object, based on a user input. Once the control unit 1500 generates the interest object, the control unit 1500 may display a list of associated applications to be selected by the user, and may match the interest object with at least one application that is selected by the user. In this case, the list of the associated applications may include titles of the associated applications recommended by the control unit 1500, based on the category of the interest object, the metadata item related to the interest object, and the metadata.

The control unit 1500 executes the associated application by using the metadata. The control unit 1500 may execute the associated application by using the metadata as an input value to the associated application. For example, if the metadata of the interest object corresponds to "010-1234-5678", and the associated application related to the interest object includes the phonebook application and the messenger application, the control unit 1500 may execute the phonebook application and the messenger application and may input the metadata "010-1234-5678" to the phonebook application and the messenger application.

Also, at least one function from among functions of the associated application may be preset to be executed according to once the interest object is selected. In this case, the control unit 1500 may execute only the at least one preset function of the associated application.

The control unit 1500 controls the display unit 1100 to display a window including an execution result of the associated application. The control unit 1500 may execute a plurality of associated applications and may display, on a screen of the control unit 1500, a window including a plurality of sub-windows that indicate execution results of the plurality of associated applications, respectively. For example, if the associated application related to the interest object corresponds to the phonebook application and the messenger application, the control unit 1500 may execute the phonebook application and the messenger application, and may display a window including sub-windows indicating execution results of the phonebook application and the messenger application, respectively.

Also, at least one function from among the functions of the associated application may be preset to be executed according to once the interest object is selected. In this case, the control unit 1500 may generate a sub-window indicating an execution result of the at least one preset function of the associated application.

Sizes of the sub-window and the window may be adjusted according to the number of associated applications and an amount of data included in the execution result of the associated application. Alternatively, the sizes of the sub-window and the window may be adjusted based on a drag input by the user.

The control unit 1500 may generate an interest object that matches a selected associated application and a selected metadata item. In more detail, the control unit 1500 selects the associated application to be matched with the interest object. The control unit 1500 may select the associated application to be matched with the interest object, based on an executed screen of an application or a user input with respect to an icon of the application.

The control unit 1500 selects one or more metadata items to be matched with the interest object. When the associated application is selected, the control unit 1500 may display a selection menu for selecting metadata items related to the associated application on the screen. Based on a user input with respect to the selection menu, the control unit 1500 may select a predetermined metadata item.

The control unit 1500 generates the interest object that matches the selected associated application and the selected metadata item. The control unit 1500 may generate the interest object configured of at least one of an image, an icon, and a text, and may match the interest object with the selected associated application and the selected metadata item. Also, the control unit 1500 may match the interest object and metadata related to the interest object.

The control unit 1500 displays the interest object on the screen. The control unit 1500 may control the display unit 1100 to display the interest object on at least one of a lock screen, a home screen, and an application screen. If the interest object displayed on the lock screen is selected by the user, the control unit 1500 may be unlocked, and the associated application related to the interest object may be executed.

The control unit 1500 updates the interest object. The metadata matching the interest object, and an execution result of the associated application matching the interest object may be updated in real-time. Accordingly, the control unit 1500 may update at least one of the image, the icon, and the text that configure the interest object.

The control unit 1500 may match the interest object with at least one function of the associated application and a partial area of the executed screen of the associated application. In more detail, the control unit 1500 selects the at least one function of the associated application. The control unit 1500 may select the at least one function from among functions of the associated application to match the at least one function with the interest object.

The control unit 1500 selects the partial area from a whole area of the executed screen of the associated application. The control unit 1500 may select the partial area from the executed screen of the associated application, based on a touch and drag input by the user.

The control unit 1500 matches at least one of the associated application, the at least one function, and the partial area with the interest object. Afterward, in response to selection of the interest object, the whole area or the partial area of the executed screen of the associated application may be displayed, or the at least one function of the associated application may be executed.

The control unit 1500 may generate a window indicating the execution result of the associated application. In more detail, the control unit 1500 executes a plurality of associated applications that match the interest object. For example, based on the table shown in FIG. 3, the control unit 1500 may check the associated applications matching the interest object, and may execute the checked associated applications.

If at least one function of the associated application is matched with the interest object, the control unit 1500 may activate only the at least one function of the associated application. Also, if the partial area of the executed screen of the associated application is matched with the interest object, the control unit 1500 may activate only a function related to the partial area of the executed screen of the associated application.

The control unit 1500 generates a plurality of sub-windows indicating execution results of the associated applications, respectively. For example, the control unit 1500 may determine a size of a sub-window, based on an amount of data included in an execution result of the associated application, and a size of an image indicating the execution result. As another example, the control unit 1500 may determine the size of the sub-window, based on how often the associated application is executed. However, exemplary one or more embodiments are not limited thereto, and the control unit 1500 may generate the sub-window indicating the execution result of the associated application, according to the determined size of the sub-window.

The control unit 1500 determines a size of a main window. The control unit 1500 may determine the size of the main window, based on the number and size of the sub-windows.

The control unit 1500 determines locations of the sub-windows. The control unit 1500 may determine the locations of the sub-windows so that the sub-windows may be arrayed in the main window according to a preset order. The control unit 1500 arrays the sub-windows in the main window.

Figure 13:
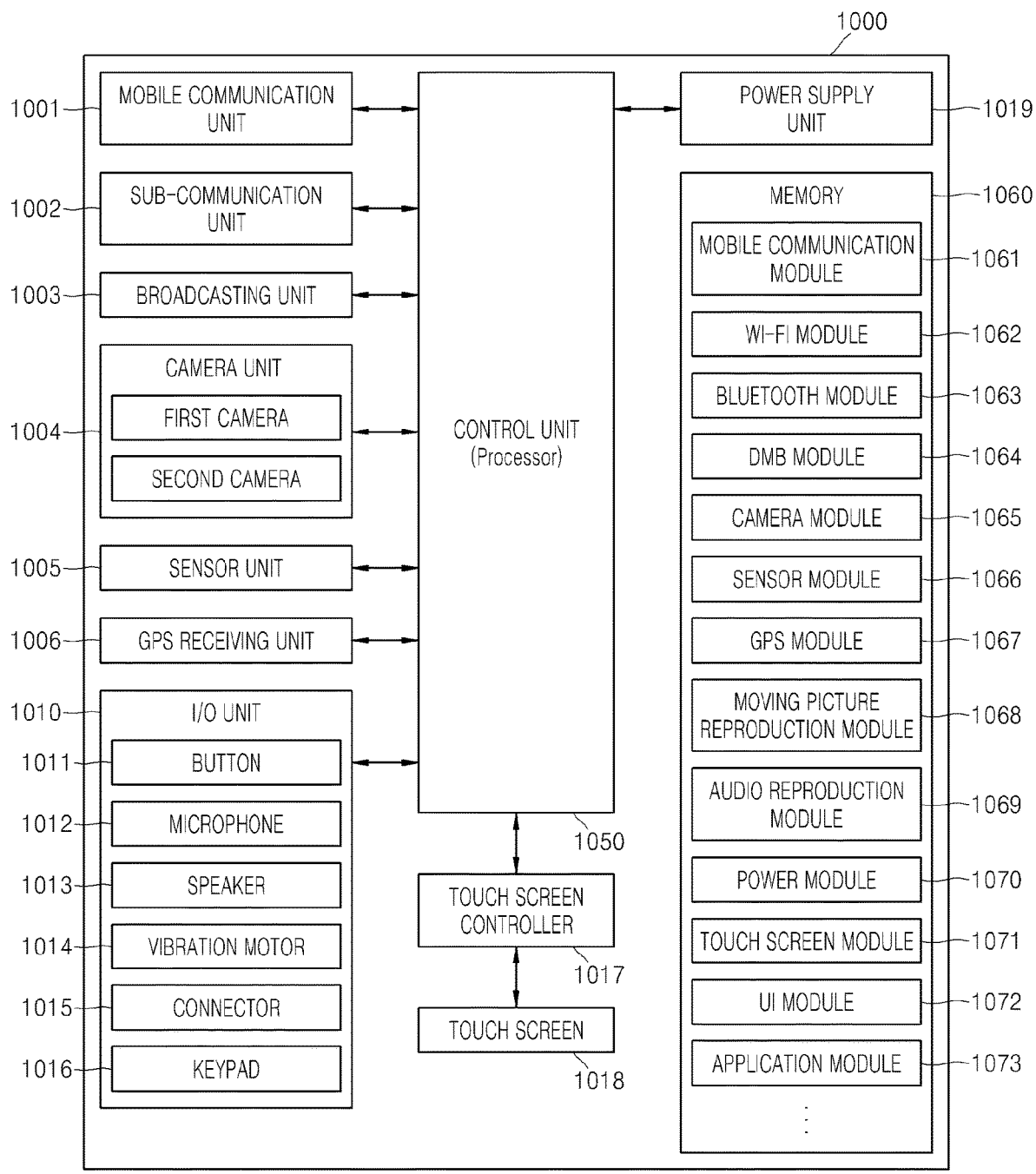
FIG. 13 is a block diagram of the device according to another embodiment.

FIG. 13 is a block diagram of the device 1000 according to another exemplary embodiment.

A mobile communication unit 1001 performs a call setup, data communication, or the like with a base station via a cellular network such as a third generation (3G) or fourth generation (4G) network. A sub-communication unit 1002 performs a function for short-distance communication such as Bluetooth or NFC. A broadcasting unit 1003 receives a Digital Multimedia Broadcasting (DMB) signal.

A camera unit 1004 includes a lens and optical elements used to capture a still image or a moving picture.

A sensor unit 1005 may include a gravity sensor for sensing motion of the host device 1000, an luminance sensor for sensing intensity of light, a proximity sensor for sensing proximity of a person, a motion sensor for sensing motion of a person, or the like.

A GPS receiving unit 1006 receives a GPS signal from a satellite. By using the GPS signal, various services may be provided to a user.

An input/output (I/O) unit 1010 provides an interface for an external device or a person, and includes a button 1011, a microphone 1012, a speaker 1013, a vibration motor 1014, a connector 1015, and a keypad 1016.

A touch screen 1018 receives a touch input by the user. A touch screen controller 1017 transfers, to a control unit (also referred as the processor) 1050, a touch input that is input via the touch screen 1018. A power supply unit 1019 is connected to a battery or an external power source to supply power to the device 1000.

The control unit 1050 may execute programs stored in a memory 1060, so that the device 1000 may generate an interest object and may display the interest object and an execution result of an associated application related to the interest object.

The programs stored in the memory 1060 may be divided into a plurality of modules according to their functions. That is, the programs stored in the memory 1060 may be divided into a mobile communication module 1061, a Wi-Fi module 1062, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, a user interface (UI) module 1072, an application module 1073, or the like.

The interest object may be displayed on at least one of a lock screen, a home screen, and an application screen of the device 1000. In this case, the application module 1073 may previously set on which screen from among the lock screen, the home screen, and the application screen the interest object will be displayed. Also, the application module 1073 may move the interest object between the lock screen, the home screen, and the application screen.

Once the interest object is selected, the application module 1073 obtains metadata related to the interest object. The application module 1073 may previously set metadata items related to the interest object.

Once the interest object is selected, the application module 1073 may check the metadata items related to the interest object, and may collect real-time values of the metadata based on the checked metadata items.

The application module 1073 determines an associated application that matches the interest object. Once the application module 1073 generates the interest object, the application module 1073 may match the associated application and the interest object. Alternatively, after the interest object is selected, the application module 1073 may determine the associated application matching the interest object.

The application module 1073 executes the associated application by using the metadata. The application module 1073 may execute the associated application by using the metadata as an input value.

Also, at least one function from among functions of the associated application may be preset to be executed according to selection of the interest object. In this case, the application module 1073 may execute only the at least one preset function of the associated application.

The application module 1073 displays a window including an execution result of the associated application. The application module 1073 may execute a plurality of associated applications and may display, on a screen of the application module 1073, a window including a plurality of sub-windows that indicate execution results of the plurality of associated applications, respectively.

Also, at least one function from among the functions of the associated application may be preset to be executed according to when the interest object is selected. In this case, the application module 1073 may generate a sub-window indicating an execution result of the at least one preset function of the associated application.

Sizes of the sub-window and the window may be adjusted according to the number of associated applications, and an amount of data included in the execution result of the associated application. Alternatively, the sizes of the sub-window and the window may be adjusted based on a drag input by the user.

The application module 1073 may generate an interest object that matches a selected associated application and a selected metadata item. In more detail, the application module 1073 selects the associated application to be matched with the interest object. The application module 1073 may select the associated application to be matched with the interest object, based on an executed screen of an application or a user input with respect to an icon of the application.

The application module 1073 selects one or more metadata items to be matched with the interest object. Once the associated application is selected, the application module 1073 may display a selection menu for selecting metadata items related to the associated application on the screen. Based on a user input with respect to the selection menu, the application module 1073 may select a predetermined metadata item.

The application module 1073 generates the interest object that matches the selected associated application and the selected metadata item. The application module 1073 may generate the interest object configured of at least one of an image, an icon, and text, and may match the interest object with the selected associated application and the selected metadata item. Also, the application module 1073 may match the interest object and metadata related to the interest object.

The application module 1073 displays the interest object on the screen. The application module 1073 may display the interest object on at least one of a lock screen, a home screen, and an application screen. If the interest object displayed on the lock screen is selected by the user, the application module 1073 may be unlocked, and the associated application related to the interest object may be executed.

The application module 1073 updates the interest object. The metadata matching the interest object, and an execution result of the associated application matching the interest object may be updated in real-time.

The application module 1073 may match the interest object with at least one function of the associated application and a partial area of the executed screen of the associated application. In more detail, the application module 1073 selects the at least one function of the associated application. The application module 1073 may select the at least one function from among functions of the associated application to match the at least one function with the interest object.

The application module 1073 selects the partial area from a whole area of the executed screen of the associated application. The application module 1073 may select the partial area from the executed screen of the associated application, based on a touch and drag input by the user.

The application module 1073 matches at least one of the associated application, the at least one function, and the partial area with the interest object. Afterward, in response to selection of the interest object, the whole area or the partial area of the executed screen of the associated application may be displayed, or the at least one function of the associated application may be executed.

The application module 1073 may generate a window indicating the execution result of the associated application. In more detail, the control unit 1500 executes a plurality of associated applications that match the interest object.

If at least one function of the associated application is matched with the interest object, the application module 1073 may activate only the at least one function of the associated application. Also, if the partial area of the executed screen of the associated application is matched with the interest object, the application module 1073 may activate only a function related to the partial area of the executed screen of the associated application.

The application module 1073 generates a plurality of sub-windows indicating execution results of the associated applications, respectively.

The application module 1073 determines a size of a main window.

The application module 1073 may determine the size of the main window, based on the number and size of the sub-windows.

The application module 1073 determines locations of the sub-windows. The application module 1073 may determine the locations of the sub-windows so that the sub-windows may be arrayed in the main window according to a preset order. The application module 1073 arrays the sub-windows in the main window.

The functions of the exemplary embodiments may be embodied as a recording medium, e.g., a program module to be executed in computers, which include computer-readable commands. The computer-readable recording medium may include any usable medium that may be accessed by computers, volatile and non-volatile media, and detachable and non-detachable media. Also, the computer-readable recording medium may include a computer storage medium and a communication medium. The computer storage medium includes all of volatile and non-volatile media, and detachable and non-detachable media which are designed to store information including computer readable commands, data structures, program modules or other data. The communication medium includes computer-readable commands, a data structure, a program module, and other transmission mechanisms, and includes other information transmission mediums.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. For example, configuring elements that are singular forms may be executed in a distributed fashion, and also, configuring elements that are distributed may be combined and then executed.

While the exemplary embodiments been particularly shown and described, it will be understood by those of ordinary skill in the art that various changes in form and details may be made therein without departing from the spirit and scope of the present disclosure as defined by the following claims.

What is claimed is:

1. A method of displaying an execution result of an application on a screen of a device, the method comprising:
displaying a metadata list on the screen of the device;
receiving a user input that selects a metadata type in the metadata list;
selecting a first partial area from an entire area of an executed screen of a first associated application based on a first user's drag input;
selecting a second partial area from an entire area of an executed screen of a second associated application based on a second user's drag input;
generating an icon associated with the metadata type, the first associated application and the second associated application, wherein the icon is generated based on the user input that selects the metadata type, and a metadata value of the metadata type which is to be used as an input value to the first associated application and the second associated application, and the selected first partial area and the selected second partial area are matched with the icon;
displaying the icon in a graphical user interface on the screen of the device;
in response to selection of the icon by a user of the device, simultaneously obtaining the metadata value of the metadata type associated with the icon;
determining the first associated application and the second associated application associated with the icon;
executing the first associated application and the second associated application by using the metadata value as the input value to the first associated application and the second associated application; and
simultaneously displaying, on the screen, a window comprising a first sub-window of a first execution result of the first associated application executed by using the metadata value and a second sub-window of a second execution result of the second associated application executed by using the metadata value,
wherein the first execution result of the first associated application is displayed in the selected first partial area of the entire area of the executed screen of the first associated application,
wherein the second execution result of the second associated application is displayed in the selected second partial area of the entire area of the executed screen of the second associated application, and
wherein the first execution result and the second execution result are displayed in real-time.

2. The method of claim 1, wherein the first associated application and the second associated application are associated with the icon according to at least one of a category of a file represented by the icon.

3. The method of claim 1, further comprising:
matching the icon with at least one function from among a plurality of functions of the first associated application,
matching the icon with at least one function from among a plurality of functions of the second associated application, and
wherein the executing of the first associated application and the second associated application comprises executing the at least one function of the first associated application and the second associated application that are matched with the icon.

4. The method of claim 3, wherein the at least one function of the first associated application and the at least one function of the second associated application are matched with the metadata and the icon, and
wherein, in response to selection of the icon, the executing comprises executing the first associated application and the second associated application that are matched with the metadata and the icon.

5. The method of claim 1, further comprising:
updating the icon displayed on the screen of the device, in response to executing the first associated application and the second associated application.

6. The method of claim 1, wherein the metadata is updated according to a preset period.

7. The method of claim 1, wherein the graphical user interface is provided to match the first associated application and the second associated application with the icon, and the first associated application and the second associated application are matched with the icon based on a user input for matching the first associated application and the second associated application with the icon via the graphical user interface.

8. The method of claim 1, wherein the icon is displayed on a lock screen of the device, and
wherein, in response to selection of the icon displayed on the lock screen, the device is unlocked, and the first associated application and the second associated application matching the icon are executed.

9. The method of claim 1, wherein the icon is displayed on at least one of a lock screen, a home screen, and an application screen of the device, and
wherein, based on a user input, the icon is moved between the lock screen, the home screen, and the application screen.

10. The method of claim 2, wherein a category of a subject of the file represented by the icon comprises at least one of the user, a location, a media, and a keyword.

11. The method of claim 1, wherein, once at least one of the first execution result of the associated application or the second execution result is updated, an image of the icon is changed.

12. A device comprising:
a memory configured to store at least one program for a method of displaying an execution result of an application on a screen of the device; and
a processor configured to execute the at least one program,
wherein the method comprises:
displaying a metadata list on the screen of the device;
receiving a user input that selects a metadata type in the metadata list;
selecting a first partial area from an entire area of an executed screen of a first associated application based on a first user's drag input;
selecting a second partial area from an entire area of an executed screen of a second associated application based on a second user's drag input;
generating an icon associated with the metadata type, the first associated application and the second associated application, wherein the icon is generated based on the user input that selects the metadata type, and a metadata value of the metadata type which is to be used as an input value to the first associated application and the second associated application, and the selected first partial area and the selected second partial area are matched with the icon;
displaying the icon in a graphical user interface on the screen of the device;
in response to selection of the icon by a user of the device, simultaneously obtaining the metadata value of the metadata type associated with the icon;
determining the first associated application and the second associated application associated with the icon;
executing the first associated application and the second associated application by using the metadata value as the input value to the first associated application and the second associated application; and
simultaneously displaying, on the screen, at least one window indicating a first execution result of the first associated application executed by using the metadata value and a second execution result of the second associated application executed by using the metadata value,
wherein the first execution result of the first associated application is displayed in the selected first partial area of the entire area of the executed screen of the first associated application, and
wherein the second execution result of the second associated application is displayed in the selected second partial area of the entire area of the executed screen of the second associated application, and
wherein the first execution result and the second execution result are displayed in real-time.

13. The device of claim 12, wherein the first associated application and the second associated application are associated with the icon according to at least one of a category of a file represented by the icon.

14. The device of claim 12, wherein the method further comprises matching the icon with at least one function from among a plurality of functions of the first associated application, and matching the icon with at least one function from among a plurality of functions of the second associated application, and wherein the executing of the first associated application and the second associated application comprises executing the at least one function of the first associated application and the second associated application that are matched with the icon.

15. The device of claim 14, wherein the at least one function of the first associated application and the at least one function of the second associated application are matched with the metadata and the icon, and
wherein, in response to selection of the icon, the executing comprises executing the first associated application and the second associated application that are matched with the metadata and the icon.

16. The device of claim 12, wherein the method further comprises:
updating the icon displayed on the screen of the device, in response to executing the first associated application and the second associated application.

17. The device of claim 12, wherein the metadata is updated according to a preset period.

18. The device of claim 12, wherein the graphical user interface is provided to match the first associated application and the second associated application with the icon, and the first associated application and the second associated application are matched with the icon based on a user input for matching the first associated application and the second associated application with the icon via the graphical user interface.

19. The device of claim 12, wherein the icon is displayed on a lock screen of the device, and
wherein, in response to selection of the icon displayed on the lock screen, the device is unlocked, and the first associated application and the second associated application matching the icon are executed.

20. The device of claim 12, wherein the icon is displayed on at least one of a lock screen, a home screen, and an application screen of the device, and
wherein, based on a user input, the icon is moved between the lock screen, the home screen, and the application screen.

21. The device of claim 13, wherein a category of a subject of the file represented by the icon comprises at least one of the user, a location, a media, and a keyword.

22. The device of claim 12, wherein, once at least one of the first execution result of the associated application or the second execution result is updated, an image of the icon is changed.

23. A non-transitory computer-readable recording medium having recorded thereon a program for executing the method of claim 1, by using a computer.

24. A mobile device comprising:
a display;
a memory configured to store computer-executable code that causes the mobile device to execute a method of executing an application, the method comprising:
displaying a metadata list on the screen of the device;
receiving a user input that selects a metadata type in the metadata list;
selecting a first partial area from an entire area of an executed screen of a first associated application based on a first user's drag input;
selecting a second partial area from an entire area of an executed screen of a second associated application based on a second user's drag input;
generating an icon associated with the metadata type, the first associated application and the second associated application, wherein the icon is generated based on the user input that selects the metadata type, and a metadata value of the metadata type which is to be used as an input value to the first associated application and the second associated application, and the selected first partial area and the selected second partial area are matched with the icon;

displaying the icon in a graphical user interface on the display;

receiving a user input selecting the icon;

simultaneously obtaining the metadata value of the metadata type which is associated with the icon, and the first associated application and the second associated application which are associated with the icon; and executing the first associated application and the second associated application by providing the metadata value to the first associated application and the second associated application as an input value passed to the first associated application and the second associated application, wherein the first execution result of the first associated application is simultaneously displayed in the selected first partial area of the entire area of the executed screen of the first associated application and the second execution result of the second associated application is simultaneously displayed in the selected second partial area of the entire area of the executed screen of the second associated application; and a processor configured to read the computer-executable code to control the mobile device to execute the method, and wherein the first execution result and the second execution result are displayed in real-time.

25. The mobile device of claim 24, wherein the first associated application is configured to receive a value of the metadata as the input value passed to the first associated application, and wherein the second associated application is configured to receive a value of the metadata as the input value passed to the second associated application.

26. The mobile device of claim 24, wherein the executing comprises displaying the first associated application and the second associated application on the display according to the metadata passed to the first associated application and the second associated application.

27. The mobile device of claim 26, wherein the metadata comprises a plurality of metadata respectively associated with the first associated application and the second associated application, and wherein the plurality of metadata are respectively passed to the first associated application and the second associated application as the input value.

* * * * *